US011922983B2

(12) United States Patent
Xu et al.

(10) Patent No.: US 11,922,983 B2
(45) Date of Patent: Mar. 5, 2024

(54) DATA READ/WRITE APPARATUS AND ELECTRONIC DEVICE

(71) Applicant: HUAWEI TECHNOLOGIES CO., LTD., Guangdong (CN)

(72) Inventors: Jia Xu, Shanghai (CN); Yuhao Zou, Shenzhen (CN); Jun Xu, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/174,700

(22) Filed: Feb. 27, 2023

(65) Prior Publication Data
US 2023/0223046 A1 Jul. 13, 2023

Related U.S. Application Data

(63) Continuation of application No. PCT/CN2021/093983, filed on May 15, 2021.

(30) Foreign Application Priority Data

Aug. 31, 2020 (CN) ......................... 202010901414.7

(51) Int. Cl.
G09G 3/32 (2016.01)
G02B 6/42 (2006.01)
G11B 7/127 (2012.01)
G11B 7/1372 (2012.01)
G11B 7/1384 (2012.01)

(52) U.S. Cl.
CPC .......... *G11B 7/1372* (2013.01); *G02B 6/4203* (2013.01); *G11B 7/127* (2013.01); *G11B 7/1384* (2013.01)

(58) Field of Classification Search
CPC ..... G11B 7/1372; G11B 7/127; G11B 7/1384; G11B 7/1275; G11B 7/1374; G11B 7/1381; G02B 6/4203; G11C 13/047; G11C 13/048
See application file for complete search history.

(56) References Cited

U.S. PATENT DOCUMENTS

| 6,501,551 B1 * | 12/2002 | Tearney | G01B 9/02091 |
| | | | 356/477 |
| 2003/0059195 A1 * | 3/2003 | Brennan, III | G02B 6/4216 |
| | | | 385/11 |
| 2010/0271928 A1 * | 10/2010 | Yamazoe | G11B 7/127 |

FOREIGN PATENT DOCUMENTS

CN 109905240 A 6/2019

OTHER PUBLICATIONS

European Search Report for EP Application No. 21859700.3 dated Jan. 19, 2024, 33 pages.

* cited by examiner

*Primary Examiner* — Andrew Sasinowski

(57) ABSTRACT

The technology of this application relates to a data read/write apparatus and an electronic device, which relate to the data storage field, and can improve data read/write performance. The data read/write apparatus includes a first laser, configured to output a first optical pulse based on a control signal, where the control signal is a signal obtained based on to-be-written data, a dispersion compensator, configured to perform dispersion compensation on the first optical pulse to output a second optical pulse, and an optical fiber lens, connected to the dispersion compensator by using an optical fiber, and configured to focus the second optical pulse onto an optical storage medium, to write the to-be-written data to the optical storage medium.

18 Claims, 16 Drawing Sheets

DATA READ/WRITE APPARATUS AND ELECTRONIC DEVICE

CROSS-REFERENCE TO RELATED APPLICATIONS

This application is a continuation of International Application No. PCT/CN2021/093983, filed on May 15, 2021, which claims priority to Chinese Patent Application No. 202010901414.7, filed on Aug. 31, 2020. The disclosures of the aforementioned applications are hereby incorporated by reference in their entireties.

TECHNICAL FIELD

Embodiments of this application relate to the data storage field, and in particular, to a data read/write apparatus and an electronic device.

BACKGROUND

Optical storage technologies have advantages of energy saving and long lifetime. Data can be written to an optical disc or read from an optical disc by using the optical storage technologies.

Currently, data is written and read by changing an optical path of a laser by using an optical component (including a reflector, an objective lens, or another component). Because the optical component is comparatively sensitive to external factors such as dust and humidity, an optical path maladjustment easily occurs. Consequently, data read/write is affected, leading to degradation of data read/write performance.

SUMMARY

Embodiments of this application provide a data read/write apparatus and an electronic device, so that data read/write performance can be improved.

To achieve the foregoing objective, the following technical solutions are used in embodiments of this application.

According to a first aspect, an embodiment of this application provides a data read/write apparatus, including: a first laser, configured to output a first optical pulse based on a control signal, where the control signal is a signal obtained based on to-be-written data; a dispersion compensator, configured to perform dispersion compensation on the first optical pulse to output a second optical pulse; and an optical fiber lens, connected to the dispersion compensator by using an optical fiber, and configured to focus the second optical pulse onto an optical storage medium, to write the to-be-written data to the optical storage medium.

Components in the data read/write apparatus provided in this embodiment of this application are optical fiber components, and the optical fiber components are connected through coupling by using optical fibers. Because the optical fiber components are insensitive to an external environment, and can work stably in a harsh environment, reading/writing data by using the data read/write apparatus can improve data read/write performance. Further, the foregoing components are connected by using the optical fibers, so that an optical path is highly integrated, and a size of the data read/write apparatus is less than a size of a conventional data read/write apparatus constructed by using optical components.

In a possible implementation, the data read/write apparatus provided in this embodiment of this application further includes a second laser, an optical fiber coupler, and a detector. The optical fiber coupler is connected to the second laser, the optical fiber lens, and the detector by using optical fibers. The second laser is configured to output first continuous laser light. The optical fiber lens is further configured to: receive the first continuous laser light, focus the first continuous laser light onto the optical storage medium, and receive a first fluorescent signal generated by the optical storage medium based on the first continuous laser light, where the first fluorescent signal is used to indicate to-be-read data. The detector is configured to detect light intensity of the first fluorescent signal, to obtain the to-be-read data.

The first continuous laser light is focused on the optical storage medium, so that a carbon-containing cluster in a recording layer of the optical storage medium is excited to generate the first fluorescent signal. The first fluorescent signal is reflected to the optical fiber lens and transmitted to the detector. The light intensity of the first fluorescent signal is detected by using the detector, to obtain the to-be-read data. Then, another module in an optical storage system performs subsequent signal processing and decoding processing on the to-be-read data.

Optionally, the detector may be a photomultiplier tube (PMT) or an avalanche photodiode (APD).

In a possible implementation, the data read/write apparatus provided in this embodiment of this application further includes an isolator, connected to the second laser and the optical fiber coupler by using optical fibers, and configured to prevent the first fluorescent signal from being transmitted to the second laser.

In a data read process, the first fluorescent signal collected by using the optical fiber lens needs to enter the detector, and if the first fluorescent signal is reflected to the second laser, the second laser may be damaged. The isolator is connected to one end of the second laser to prevent the first fluorescent signal from entering the second laser, thereby ensuring safe running of the second laser.

In a possible implementation, the first laser includes a femtosecond laser or a picosecond laser. A pulse width of pulsed laser light generated by the femtosecond laser is at a femtosecond ($10^{-15}$ second) scale. A pulse width of pulsed laser light generated by the picosecond laser is at a picosecond ($10^{-12}$ second) scale.

In a possible implementation, the dispersion compensator includes a chirp compensator. The chirp compensator adjusts a dispersion parameter by using a prism pair or a grating pair, so as to provide reverse dispersion to perform dispersion compensation on the first optical pulse, thereby obtaining the second optical pulse.

According to a second aspect, an embodiment of this application provides a data read/write apparatus, including a (second) laser, an optical fiber coupler, an optical fiber lens, and a detector. The optical fiber coupler is connected to the second laser, the optical fiber lens, and the detector by using optical fibers. The second laser is configured to output first continuous laser light. The optical fiber lens is configured to: receive the first continuous laser light, focus the first continuous laser light onto an optical storage medium, and receive a first fluorescent signal generated by the optical storage medium based on the first continuous laser light, where the first fluorescent signal is used to indicate to-be-read data. The detector is configured to detect light intensity of the first fluorescent signal, to obtain the to-be-read data.

It should be noted that how data stored in the optical storage medium is written is not limited in this embodiment of this application.

The first continuous laser light is focused on the optical storage medium, so that a carbon-containing cluster in a recording layer of the optical storage medium is excited to generate the first fluorescent signal. The first fluorescent signal is reflected to the optical fiber lens and transmitted to the detector. The light intensity of the first fluorescent signal is detected by using the detector, to obtain the to-be-read data. Then, another module in an optical storage system performs subsequent signal processing and decoding processing on the to-be-read data.

Optionally, the detector may be a photomultiplier tube (PMT) or an avalanche photodiode (APD).

Components in the data read/write apparatus provided in this embodiment of this application are optical fiber components, and the optical fiber components are connected through coupling by using optical fibers. Because the optical fiber components are insensitive to an external environment, and can work stably in a harsh environment, reading/writing data by using the data read/write apparatus can improve data read/write performance.

Further, the foregoing components are connected by using the optical fibers, so that an optical path is highly integrated, and a size of the data read/write apparatus is less than a size of a conventional data read/write apparatus constructed by using optical components.

In a possible implementation, the data read/write apparatus provided in this embodiment of this application further includes an isolator, connected to the second laser and the optical fiber coupler by using optical fibers, and configured to prevent the first fluorescent signal from being transmitted to the second laser.

In a data read process, the first fluorescent signal collected by using the optical fiber lens needs to enter the detector, and if the first fluorescent signal is reflected to the second laser, the second laser may be damaged. The isolator is connected to one end of the second laser, to prevent the first fluorescent signal from entering the second laser, thereby ensuring safe running of the second laser.

With reference to any one of the first aspect or the possible implementations of the first aspect, or the second aspect or the possible implementations of the second aspect, the data read/write apparatus provided in this embodiment of this application further includes a band-pass filter, connected to the detector and the optical fiber coupler separately, and configured to receive the first fluorescent signal and filter the first fluorescent signal. The detector is specifically configured to detect light intensity of the filtered first fluorescent signal, to obtain the to-be-read data.

A filtering band of the band-pass filter is 600-700 nm. Stray light and reflected light whose wavelengths are outside the band of 600-700 nm can be filtered out by using the band-pass filter, thereby increasing a signal-to-noise ratio of the first fluorescent signal, so that to-be-read data detected by the detector is more accurate.

With reference to any one of the first aspect or the possible implementations of the first aspect, or the second aspect or the possible implementations of the second aspect, the data read/write apparatus provided in this embodiment of this application further includes a piezoelectric actuator, configured to drive the optical fiber lens to move, so as to adjust a location of the optical fiber lens. The location of the optical fiber lens corresponds to a location of a data recording point on the optical storage medium. The location of the optical fiber lens is adjusted by adjusting an input voltage of the piezoelectric actuator, to change a location, on the optical storage medium, of a light spot focused on the optical storage medium, so as to read data at different data recording points on the optical storage medium.

The piezoelectric actuator is a three-axis piezoelectric actuator. To be specific, the piezoelectric actuator can control the optical fiber lens to move in three dimensions of space (for example, along an x-axis, ay-axis, and a z-axis). In moving along the x-axis and the y-axis, the optical fiber lens can be controlled to focus the second optical pulse onto different locations on a plane of the optical storage medium. In moving along the z-axis, the optical fiber lens can be controlled to focus the second optical pulse onto different recording layers of the optical storage medium, that is, a depth of the focused light spot on the optical storage medium is controlled, to read data at different recording layers.

With reference to any one of the first aspect or the possible implementations of the first aspect, or the second aspect or the possible implementations of the second aspect, the optical fiber lens includes any one of the following: a gradient-index (GRIN) fiber lens, a metamaterial lens, or an optical fiber end ball lens.

For the GRIN fiber lens, a refractive index of the GRIN fiber lens is continuously changing, and therefore, the GRIN fiber lens has a self-focusing function and comparatively good focusing performance. In addition, because an end face of the GRIN fiber lens is a plane, the GRIN fiber lens can be easily integrated, through fusion, with another optical component whose end face is a plane. This helps improve mechanical strength and stability of a probe.

Further, because a terminal (an end adjacent to the optical storage medium) of the GRIN fiber lens has a small size, which may be down to a millimeter scale, and the GRIN fiber lens has a light weight, the GRIN fiber lens can support a servo feedback signal of a higher frequency.

With reference to any one of the first aspect or the possible implementations of the first aspect, or the second aspect or the possible implementations of the second aspect, a wavelength range of the first continuous laser light output by the second laser is 400-500 nanometers.

With reference to any one of the first aspect or the possible implementations of the first aspect, or the second aspect or the possible implementations of the second aspect, a wavelength of the first fluorescent signal ranges from 600 nanometers to 700 nanometers.

According to a third aspect, an embodiment of this application provides a data read/write apparatus, including a first laser, a dispersion compensator, a first optical fiber coupler, N optical switches, an N-channel photoelectric controller, and N optical fiber lenses. The first optical fiber coupler is connected to the N optical switches by using optical fibers. The N-channel photoelectric controller is connected to the N optical switches separately. The N optical switches are correspondingly connected to the N optical fiber lenses by using optical fibers. N is a positive integer greater than or equal to 2. The first laser is configured to output a first optical pulse. The dispersion compensator is configured to perform dispersion compensation on the first optical pulse to output a second optical pulse. The first optical fiber coupler is connected to the dispersion compensator by using an optical fiber, and is configured to split the second optical pulse into N beams of optical pulses. The N-channel photoelectric controller is configured to control states of the N optical switches based on N control signals, to adjust light intensity of the N beams of optical pulses. The N control signals are signals respectively obtained based on N pieces of to-be-written data. The N beams of optical pulses are used to indicate the N pieces of to-be-written data. The N optical fiber lenses are configured to focus the N beams of optical pulses onto an optical storage medium, to write the N pieces of to-be-written data to the optical storage medium. The N optical fiber lenses are in one-to-one correspondences with the N beams of optical pulses.

With the data read/write apparatus, N pieces of data can be read from the optical storage medium in parallel, thereby significantly improving data read efficiency.

In a possible implementation, the first optical fiber coupler is a 1×N optical fiber coupler, and the first optical fiber coupler is used as a beam splitter. When there are N pieces of to-be-written data, the first optical fiber coupler splits the first optical pulse into N identical optical pulses.

In a possible implementation, the data read/write apparatus provided in this embodiment of this application further includes a second laser, a second optical fiber coupler, N third optical fiber couplers, and an N-channel detector. The N third optical fiber couplers are connected to the second optical fiber coupler, the N optical fiber lenses, and the N-channel detector by using optical fibers. The second laser is configured to output first continuous laser light. The second optical fiber coupler is connected to the second laser by using an optical fiber, and is configured to split the first continuous laser light into N beams of continuous laser light. The N optical fiber lenses are further configured to: receive the N beams of continuous laser light, focus the N beams of continuous laser light onto the optical storage medium, and receive N fluorescent signals generated by the optical storage medium based on the N beams of continuous laser light. The N optical fiber lenses are in one-to-one correspondences with the N beams of continuous laser light. The N fluorescent signals are respectively used to indicate N pieces of to-be-read data. The N-channel detector is configured to detect light intensity of the N fluorescent signals separately, to obtain the N pieces of to-be-read data.

According to a fourth aspect, an embodiment of this application provides a data read/write apparatus, including a second laser, a second optical fiber coupler, N third optical fiber couplers, N optical fiber lenses, and an N-channel detector. The N third optical fiber couplers are connected to the second optical fiber coupler, the N optical fiber lenses, and the N-channel detector by using optical fibers. The second laser is configured to output first continuous laser light. The second optical fiber coupler is connected to the second laser by using an optical fiber, and is configured to split the first continuous laser light into N beams of continuous laser light. The N optical fiber lenses are configured to: receive the N beams of continuous laser light, focus the N beams of continuous laser light onto an optical storage medium, and receive N fluorescent signals generated by the optical storage medium based on the N beams of continuous laser light. The N optical fiber lenses are in one-to-one correspondences with the N beams of continuous laser light. The N fluorescent signals are respectively used to indicate N pieces of to-be-read data. The N-channel detector is configured to detect light intensity of the N fluorescent signals separately, to obtain the N pieces of to-be-read data.

With the data read/write apparatus provided in this embodiment of this application, N pieces of data stored in the optical storage medium (a transparent optical disc) can be read in parallel, thereby significantly improving data read efficiency.

With reference to any one of the third aspect or the possible implementations of the third aspect, or the fourth aspect or the possible implementations of the fourth aspect, the data read/write apparatus provided in this embodiment of this application further includes an isolator, connected to the second laser and the second optical fiber coupler by using optical fibers, and configured to prevent the N fluorescent signals from being transmitted to the second laser, thereby ensuring that the second laser is not damaged by the fluorescent signals.

With reference to any one of the third aspect or the possible implementations of the third aspect, or the fourth aspect or the possible implementations of the fourth aspect, the data read/write apparatus provided in this embodiment of this application further includes N band-pass filters, connected to the N-channel detector and the N third optical fiber couplers by using optical fibers, and configured to: receive the N fluorescent signals and filter the N fluorescent signals. The N band-pass filters are in one-to-one correspondences with the N fluorescent signals. The N-channel detector is specifically configured to detect light intensity of the N filtered fluorescent signals, to obtain the to-be-read data. The N band-pass filters can respectively filter out stray light and reflected light in the N fluorescent signals, thereby increasing signal-to-noise ratios of the N fluorescent signals, and improving accuracy of read data.

With reference to any one of the third aspect or the possible implementations of the third aspect, or the fourth aspect or the possible implementations of the fourth aspect, the data read/write apparatus provided in this embodiment of this application further includes a piezoelectric actuator, configured to drive the N optical fiber lenses to move, so as to adjust locations of the N optical fiber lenses. The locations of the N optical fiber lenses respectively correspond to locations of different data recording points on the optical storage medium.

It should be noted that the data read/write apparatus in this embodiment of this application includes one piezoelectric actuator, and the piezoelectric actuator can simultaneously drive the N optical fiber lenses to move along a same direction. Optionally, the N optical fiber lenses may be fastened together, and the piezoelectric actuator is fastened to one side of one of the optical fiber lenses.

According to a fifth aspect, an embodiment of this application provides an electronic device. The electronic device includes an optical storage medium and the data read/write apparatus according to any one of the first aspect or the possible implementations of the first aspect. Alternatively, the electronic device includes the data read/write apparatus according to any one of the second aspect or the possible implementations of the second aspect. Alternatively, the electronic device includes the data read/write apparatus according to any one of the third aspect or the possible implementations of the third aspect. Alternatively, the electronic device includes the data read/write apparatus according to any one of the fourth aspect or the possible implementations of the fourth aspect.

DESCRIPTION OF EMBODIMENTS

The term "and/or" in this specification describes only an association relationship between associated objects and represents that at least three relationships may exist. For example, A and/or B may represent the following three cases: only A exists, both A and B exist, and only B exists.

In the specification and the claims in embodiments of this application, the terms "first", "second", and so on are intended to distinguish between different objects but do not indicate a particular order of the objects. For example, a first optical pulse, a second optical pulse, and the like are intended to distinguish between different optical pulses, but are not intended to describe a specific order of the optical pulses; a first laser, a second laser, and the like are intended to distinguish between different lasers, but are not intended to describe a specific order of the lasers.

In embodiments of this application, the expression "example" or "for example" is used to represent giving an example, an illustration, or a description. Any embodiment or implementation scheme described by the expression "example" or "for example" in embodiments of this application should not be explained as being more preferred or having more advantages than another embodiment or implementation scheme. Exactly, use of the expression "example" or "for example" or the like is intended to present a relative concept in a specific manner.

In the description of embodiments of this application, unless otherwise stated, "a plurality of" means two or more than two. For example, a plurality of processing units refer to two or more processing units; and a plurality of systems refer to two or more systems.

For the problem existing in the background, embodiments of this application provide a data read/write apparatus and an electronic device. A first laser in the data read/write apparatus outputs a first optical pulse based on a control signal, where the first optical pulse is a signal obtained based on to-be-written data. Then, a dispersion compensator performs dispersion compensation on the first optical pulse and outputs a second optical pulse. Further, an optical fiber lens connected to the dispersion compensator focuses the second optical pulse onto an optical storage medium, to write the to-be-written data to the optical storage medium. Components (for example, the dispersion compensator and the optical fiber lens) in the data read/write apparatus are optical fiber components, and the optical fiber components are connected through coupling by using optical fibers. Because the optical fiber components are insensitive to an external environment, and can work stably in a harsh environment, reading/writing data by using the data read/write apparatus can improve data read/write performance.

Figure 1:
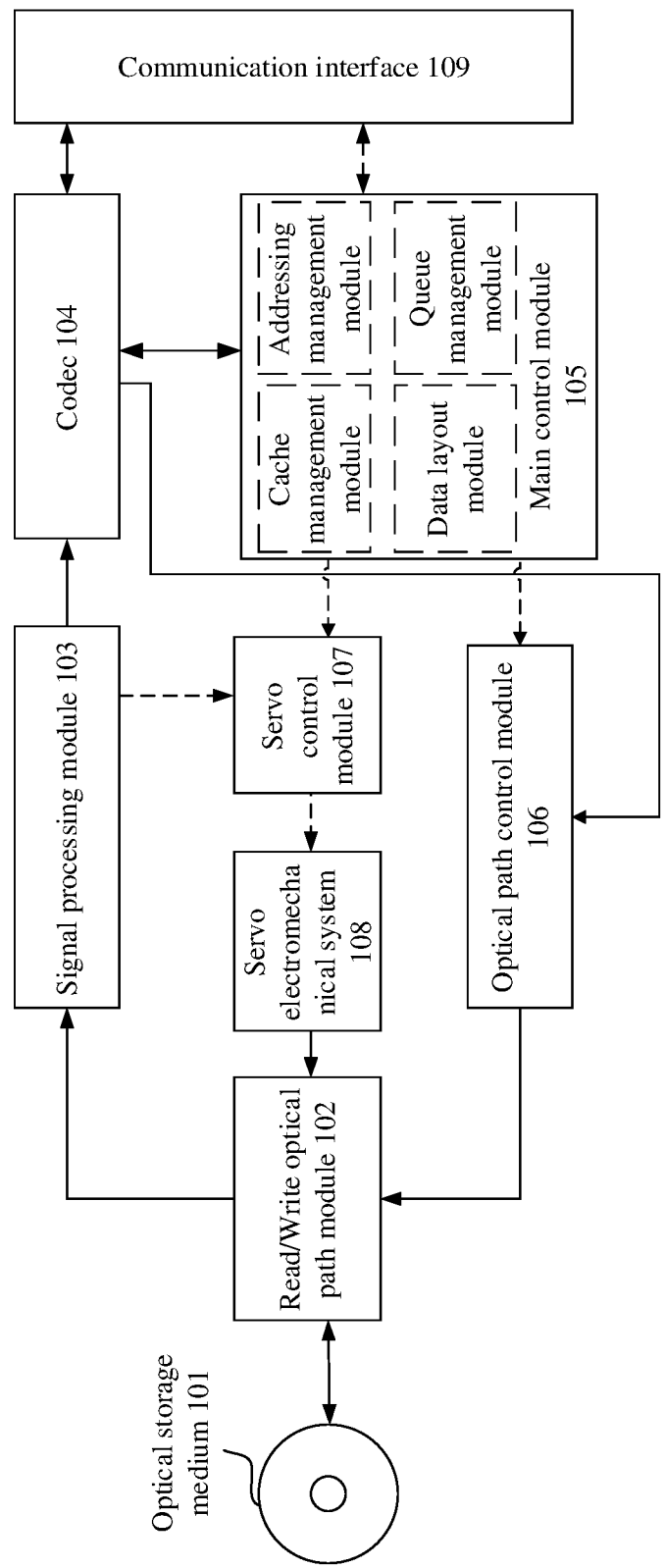
FIG. 1 is an example schematic diagram of an architecture of an optical storage system according to an embodiment of this application.

The data read/write apparatus provided in embodiments of this application may be applied to an optical storage system shown in FIG. 1. The optical storage system includes an optical storage medium 101, a read/write optical path module 102, a signal processing module 103, a codec 104, a main control module 105, an optical path control module 106, a servo control module 107, a servo motor system 108, and a communication interface 109.

The optical storage medium 101 may be an optical disc. The optical disc includes a read-only optical disc and a recording-type optical disc. Common optical discs include a CD, a DVD, a Blu-ray optical disc, a transparent optical disc, and the like. The optical storage medium in embodiments of this application is a transparent optical disc. Generally, a thickness of the optical disc is approximately 1.2 millimeters (mm), and a diameter of the optical disc is 120 mm. A capacity of a single optical disc ranges from a GB level to a TB level.

The optical disc mainly includes a substrate, a recording layer, and a protective layer. The substrate is a carrier of each part of the optical disc, and is also a physical housing of the optical disc. The substrate may be made of a material such as polycarbonate (PC). The recording layer is a signal recording layer in the optical disc. The recording layer includes an organic material (or a phase-change material) with which the substrate is coated. The recording layer is irradiated by laser light to write data or read data. The protective layer is configured to: protect the recording layer, and prevent the recording layer from being damaged. Optionally, a material of the protective layer may be a photocurable acrylic material.

The optical disc may have a plurality of recording layers. For example, a Blu-ray optical disc includes four recording layers, and a capacity thereof may reach 300 GB; a transparent optical disc may have more than 30 recording layers, and a capacity thereof may reach a TB level.

Optionally, in some cases, a reflection layer is further included between the recording layer and the protective layer. The reflection layer is configured to reflect laser light to read data in the optical disc. Outside the protective layer, a print layer is further included. Information such as an identifier and a capacity of the optical disc is printed on the print layer.

It should be understood that, for different types of optical discs, layers of the optical discs may be made of different materials. For example, a recording layer of a Blu-ray optical disc is made of a phase-change material; for a transparent optical disc, a transparent optical disc includes a homogeneous material and a substrate, and hierarchical write is implemented through focusing at different depths, where the homogeneous material may be a material such as a PC material, polymethyl methacrylate (PMAA), or polydimethyl siloxane (PDMS).

The read/write optical path module 102 is configured to: write an optical signal (the optical signal indicates to-be-written data) to the optical storage medium 101, or read an optical signal (the optical signal indicates to-be-read data) from the optical storage medium 101.

In this embodiment of this application, the read/write optical path module 102 includes an optical component and an optical fiber component. The data read/write apparatus provided in embodiments of this application is the read/write optical path module 102 in the optical storage system. The data read/write apparatus is described in detail in the following embodiments.

The signal processing module 103 is configured to: process an optical signal (indicating to-be-read data) output by the read/write optical path module 102, and remove an interfering signal from the optical signal.

The codec 104 is configured to encode to-be-written data or decode to-be-read data.

The main control module 105 is configured to: in a data write or data read process, perform transaction control management, and generate a circuit control signal and a servo control signal based on to-be-written data. The circuit control signal is input to the optical path control module 106, and the servo control signal is input to the servo control module 107.

The main control module 105 includes a cache management module, an addressing management module, a data layout module, and a queue management module. The cache management module is configured to cache to-be-written data. The addressing management module is configured to generate a corresponding physical location of data on a disk sheet. The data layout module is configured to arrange data in different partitions of the optical disc according to a rule. The queue management module is configured to manage a cache queue.

The optical path control module 106 is configured to: generate an optical control signal (which may also be referred to as a control signal) based on the circuit control signal, and input the optical control signal to the read/write optical path module 102.

The servo control module 107 is connected to the servo motor system 108. The servo control module 107 drives a motor in the servo motor system 108 based on a servo control signal output, to control a location of an optical head that is used for reading data or writing data and that is in the read/write optical path module.

The communication interface 109 is configured to: receive a data write instruction and a data read instruction, and receive to-be-written data or output to-be-read data.

With reference to the functions of the modules in the foregoing optical storage system, the following briefly describes a process of writing data to an optical storage medium and a process of reading data from an optical storage medium.

Data writing: To-be-written data and a data write instruction are received through the communication interface 109. The codec 104 encodes the to-be-written data, stores the encoded to-be-written data in a cache, and further transmits the to-be-written data to the optical path control module 106. The optical path control module 106 adjusts and controls an optical path based on the to-be-written data and a circuit control signal output by the main control module 105, to generate an optical control signal. The read/write optical path module 102 generates a laser signal based on the optical control signal, and focuses the laser signal onto the optical storage medium 101, thereby completing data write. In the data write process, the servo control module 107 and the servo motor system 108 control the motor of the servo motor system 108 based on a servo control signal output by the main control module 105, to control the optical head in the read/write optical path module to move, so that the optical head corresponds to different locations (locations in three-dimensional space, including upper and lower, left and right, and front and rear locations) on the optical storage medium 101, thereby reaching different locations on the optical storage medium 101.

Data reading: A data read instruction is received through the communication interface 109. Then, the main control module 105 generates a servo control signal and a circuit control signal, so that the optical path control module 106 generates an optical control signal based on the circuit control signal. The read/write optical path module 102 generates a laser signal based on the optical control signal (it should be noted that the laser signal is different from a laser signal generated during data writing), and focuses the laser signal onto the optical storage medium 101. In addition, the read/write optical path module 102 receives a fluorescent signal reflected by the optical storage medium 101, and further detects the fluorescent signal to obtain to-be-read data. After the to-be-read data is processed by the signal processing module 103, the codec 104 decodes and outputs the to-be-read data, thereby completing data read.

Figure 2:
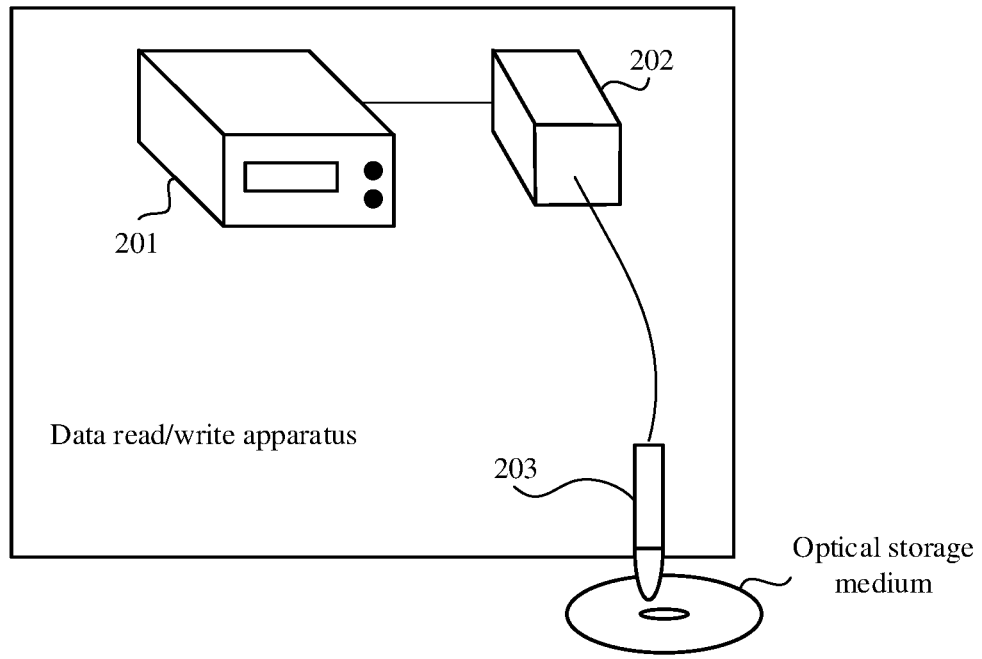
FIG. 2 is an example first schematic diagram of a structure of a data read/write apparatus according to an embodiment of this application.

With reference to the foregoing optical storage system, as shown in FIG. 2, an embodiment of this application provides a data read/write apparatus, configured to write data. The data read/write apparatus includes a first laser 201, a dispersion compensator 202, and an optical fiber lens 203. The first laser 201 is connected to an input end of the dispersion compensator 202. An output end of the dispersion compensator 202 is connected to the optical fiber lens 203.

The first laser 201 is configured to output a first optical pulse based on a control signal. The control signal is a signal obtained based on to-be-written data. The dispersion compensator 202 is configured to perform dispersion compensation on the first optical pulse to output a second optical pulse. The optical fiber lens 203 is connected to the dispersion compensator 202 by using an optical fiber, and is configured to focus the second optical pulse onto an optical storage medium, to write the to-be-written data to the optical storage medium.

In this embodiment of this application, the first laser 201 is a device for generating a light source in the data read/write apparatus. During data writing, the first laser 201 is turned on, and after receiving the control signal output by an optical path control module in an optical storage system, the first laser 201 generates pulsed laser light (namely, the first optical pulse) based on the control signal. Optionally, the first laser 201 may be a femtosecond laser or a picosecond laser. Femtosecond lasers or picosecond lasers may also be generally referred to as ultrafast lasers. A pulse width of pulsed laser light generated by a femtosecond laser is at a femtosecond ($10^{-15}$ second) scale. A pulse width of pulsed laser light generated by a picosecond laser is at a picosecond ($10^{-12}$ second) scale.

Optionally, the first laser 201 may be an ytterbium-doped fiber laser. Laser light output by the ytterbium-doped fiber laser has a wavelength of 1030 nanometers (nm), a repetition frequency of 40 megahertz (MHz), a pulse width of 200 femtoseconds (fs), and an output power of 5 watts (W).

In this embodiment of this application, when an optical pulse is transmitted in an optical fiber, the optical fiber may cause dispersion, which leads to an increase in a pulse width of the optical pulse, and affects accuracy of written data. Therefore, the first optical pulse generated by the first laser 201 is input to the dispersion compensator 202, to compensate for dispersion caused by the optical fiber, and adjust the pulse width to a required parameter value.

Optionally, the dispersion compensator 202 includes a chirp compensator. The chirp compensator adjusts a dispersion parameter by using a prism pair or a grating pair, so as to provide reverse dispersion to perform dispersion compensation on the first optical pulse, thereby obtaining the second optical pulse. It should be understood that the chirp compensator is connected to the optical fiber lens 203 by using an optical fiber. The chirp compensator includes a focusing lens. The second optical pulse obtained through dispersion compensation is coupled into the optical fiber through the focusing lens, to be transmitted to the optical fiber lens 203.

In this embodiment of this application, the optical fiber lens 203, serving as a probe of the data read/write apparatus, focuses the first optical pulse onto the optical storage medium (an optical disc). Because the first optical pulse generated by the first laser 201 is ultrashort pulsed laser light, the ultrashort pulsed laser light is focused on the optical storage medium, so that a carbon-oxygen bond and a carbon-carbon bond in a transparent material of a recording layer of the optical storage medium are broken, thereby forming a carbon-containing cluster with a fluorescence effect, to complete data write.

The optical fiber lens 203 may be a gradient-index (GRIN) fiber lens. A refractive index of the GRIN fiber lens changes with gradients. Specifically, the refractive index of the GRIN fiber lens gradually decreases in a radial direction along a central axis of the GRIN fiber lens. When the second optical pulse is propagated in the GRIN fiber lens after entering the GRIN fiber lens, a light ray is continuously deflected. Because the refractive index of the GRIN fiber lens is continuously changing, the GRIN fiber lens has a self-focusing function and comparatively good focusing performance. In addition, because an end face of the GRIN fiber lens is a plane, the GRIN fiber lens can be easily integrated, through fusion, with another optical component whose end face is a plane. This helps improve mechanical strength and stability of the probe.

Further, because a terminal (an end adjacent to the optical storage medium) of the GRIN fiber lens has a small size, which may be down to a millimeter scale, and the GRIN fiber lens has a light weight, the GRIN fiber lens can support a servo feedback signal of a higher frequency.

Optionally, the optical fiber lens 203 may alternatively be another lens such as a metamaterial lens or an optical fiber end ball lens. Specifically, a suitable optical fiber lens may be selected based on an actual use requirement. This is not limited in this embodiment of this application.

Figure 3:
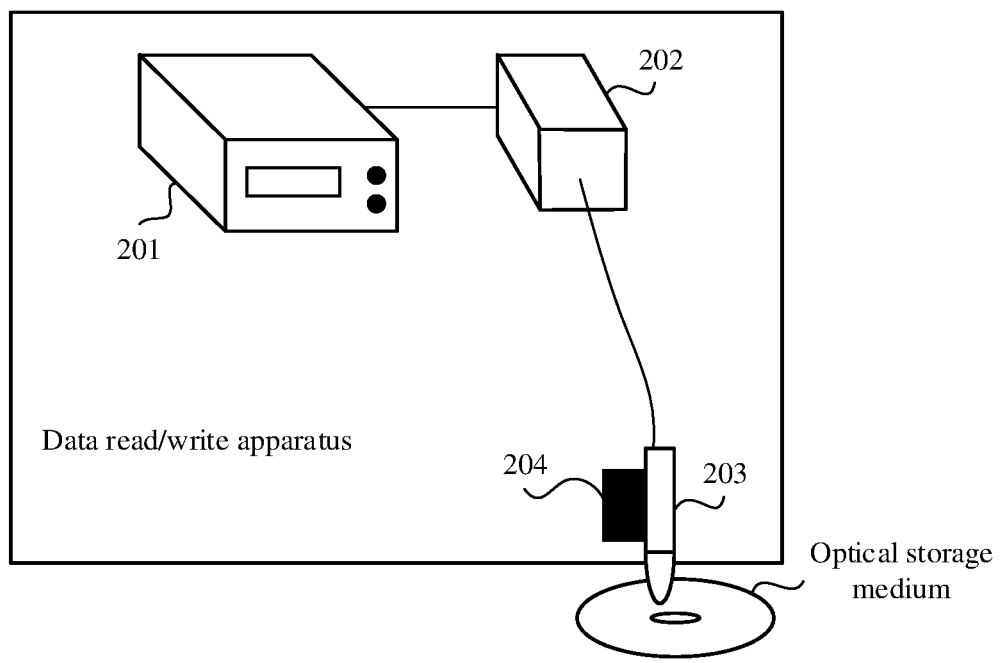
FIG. 3 is an example second schematic diagram of a structure of a data read/write apparatus according to an embodiment of this application.

In an implementation, as shown in FIG. 3, the data read/write apparatus provided in this embodiment of this application further includes a piezoelectric actuator 204. The optical fiber lens 203 is fastened to one side of the piezoelectric actuator 204. The piezoelectric actuator 204 is configured to drive the optical fiber lens 203 to move, so as to adjust a location of the optical fiber lens 203. The location of the optical fiber lens 203 corresponds to a location of a data recording point on the optical storage medium.

In this embodiment of this application, the location of the optical fiber lens 203 is adjusted by adjusting an input voltage of the piezoelectric actuator 204, to change a location, on the optical storage medium, of a light spot focused on the optical storage medium, so as to write data at different data recording points on the optical storage medium. It should be understood that a servo feedback signal can be output in real time by using a servo control system in the optical storage system, so as to adjust the input voltage of the piezoelectric actuator 204, thereby adjusting the location of the optical fiber lens 203 in real time.

With reference to FIG. 3, the piezoelectric actuator 204 is a three-axis piezoelectric actuator. To be specific, the piezoelectric actuator 204 can control the optical fiber lens 203 to move in three dimensions of space (for example, along an x-axis, a y-axis, and a z-axis). In moving along the x-axis and the y-axis, the optical fiber lens 203 can be controlled to focus the second optical pulse onto different locations on a plane of the optical storage medium. In moving along the z-axis, the optical fiber lens 203 can be controlled to focus the second optical pulse at different recording layers of the optical storage medium, that is, a depth of the focused light spot on the optical storage medium is controlled, to write data at different recording layers.

Optionally, the focusing lens in the chirp compensator is fastened to the optical fiber by using ultraviolet glue, and the optical fiber lens 203 is fastened to one side of the piezoelectric actuator 204 by using ultraviolet glue.

Optionally, a device for driving the optical fiber lens 203 to move may alternatively be a voice coil motor. In other words, the piezoelectric actuator 204 may be replaced with a voice coil motor.

Figure 4:
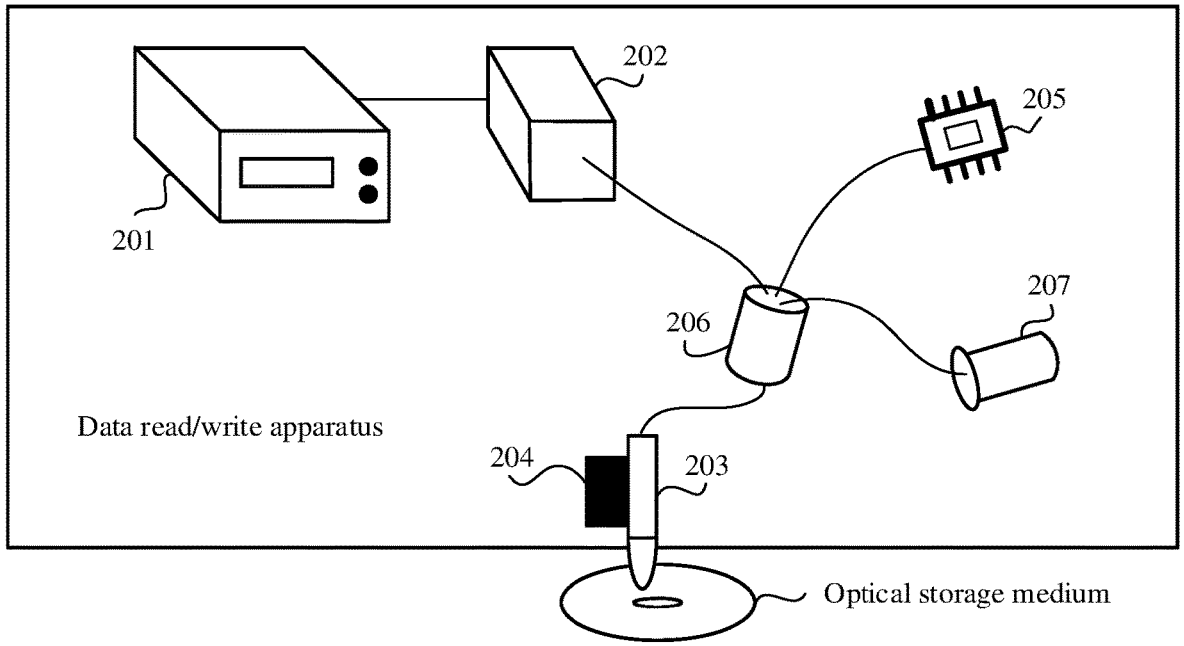
FIG. 4 is an example third schematic diagram of a structure of a data read/write apparatus according to an embodiment of this application.

As shown in FIG. 4, the data read/write apparatus provided in this embodiment of this application further includes a (second) laser 205, an optical fiber coupler 206, and a detector 207, which may be configured to read data. The optical fiber coupler 206 is connected to the second laser 205, the optical fiber lens 203, and the detector 207 by using optical fibers. The second laser 205 is configured to output first continuous laser light. The optical fiber lens 203 is further configured to: receive the first continuous laser light, focus the first continuous laser light onto the optical storage medium, and receive a first fluorescent signal generated by the optical storage medium based on the first continuous laser light, where the first fluorescent signal is used to indicate to-be-read data. The detector 207 is configured to detect light intensity of the first fluorescent signal, to obtain the to-be-read data.

In this embodiment of this application, the optical fiber coupler is a connection component between optical fiber components. The optical fiber coupler includes two ends (which may be referred to as a first end and a second end). The first end and the second end are respectively connected to different components. A specification of the optical fiber coupler is denoted by 1×N, where 1 represents a quantity of ports at the first end, and N represents a quantity of ports at the second end, that is, the first end includes one port, and the second end includes N (N is a positive integer greater than or equal to 1) ports that can be configured to connect to N components. For example, the data read/write apparatus includes one 1×3 optical fiber coupler, in other words, the optical fiber coupler 206 in FIG. 3 is a 1×3 optical fiber coupler. A port at the first end of the optical fiber coupler 206 is connected to the optical fiber lens 203. The first port at the second end is connected to the dispersion compensator 202, the second port at the second end is connected to the second laser 205, and the third port at the second end is connected to the detector 207.

Figure 5:
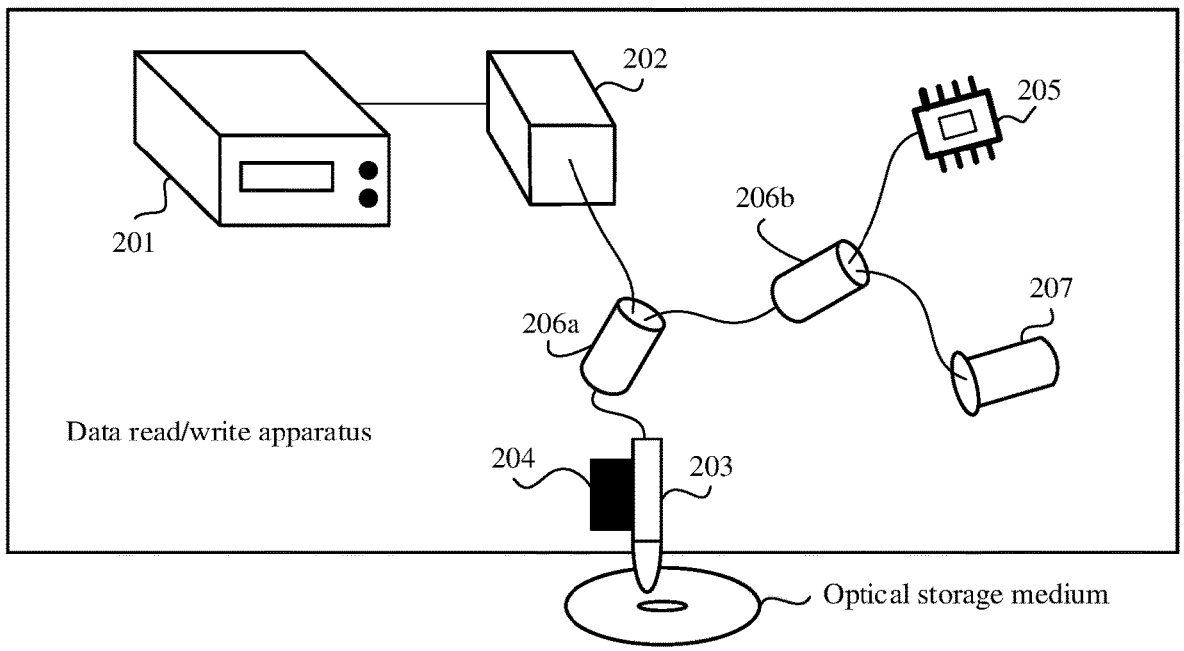
FIG. 5 is an example fourth schematic diagram of a structure of a data read/write apparatus according to an embodiment of this application.

Optionally, the data read/write apparatus provided in this embodiment of this application may alternatively include two 1×2 optical fiber couplers. As shown in FIG. 5, a first end of an optical fiber coupler 206a is connected to the optical fiber lens 203, the first port at a second end of the optical fiber coupler 206a is connected to the dispersion compensator 202, a first end of an optical fiber coupler 206b is connected to the second port at the second end of the optical fiber coupler 206a, the first port at a second end of the optical fiber coupler 206b is connected to the second laser 205, and the second port at the second end of the optical fiber coupler 206b is connected to the detector 207.

It should be noted that, in actual application, optical fiber couplers of different specifications and different quantities may be selected based on specific requirements. This is not limited in this embodiment of this application.

In a data read process, the second laser 205 is turned on, to generate the first continuous laser light for exciting the carbon-containing cluster with the fluorescence effect in the optical storage medium. Specifically, the first continuous laser light is transmitted to the optical fiber lens 203 by using an optical fiber. The optical fiber lens 203 focuses the first continuous laser light onto the optical storage medium, so that the carbon-containing cluster in the recording layer of the optical storage medium is excited to generate the first fluorescent signal. The first fluorescent signal is reflected to the optical fiber lens 203 and transmitted to the detector 207. The light intensity of the first fluorescent signal is detected by using the detector 207, to obtain the to-be-read data. Then, another module in the optical storage system performs subsequent signal processing and decoding processing on the to-be-read data.

The second laser 205 is a continuous-light laser pulser, configured to generate continuous laser light. Optionally, the second laser 205 may be a continuous-light semiconductor laser. A wavelength of laser light generated by the continuous-light semiconductor laser ranges from 400 nm to 500 nm, and an output power of the continuous-light semiconductor laser is 10 milliwatts (mW). The continuous laser light whose wavelength ranges from 400 nm to 500 nm is focused on the optical storage medium, so that a first fluorescent signal whose wavelength ranges from 600 nm to 700 nm can be generated.

Optionally, the detector 207 may be a photomultiplier tube (PMT) or an avalanche photodiode (APD).

Similarly, in a data read process, the piezoelectric actuator 204 may drive the optical fiber lens 203 to move, so as to adjust the location of the optical fiber lens 203, thereby reading data recorded at data recording points at different locations on the optical storage medium.

It can be understood that, in the foregoing data write and data read processes, lasers for generating light sources (laser signals) are two lasers operating independently. During data writing, the pulsed laser light is generated by using the ultrafast laser. During data reading, the continuous laser light is generated by using the continuous-light semiconductor laser.

Figure 6:
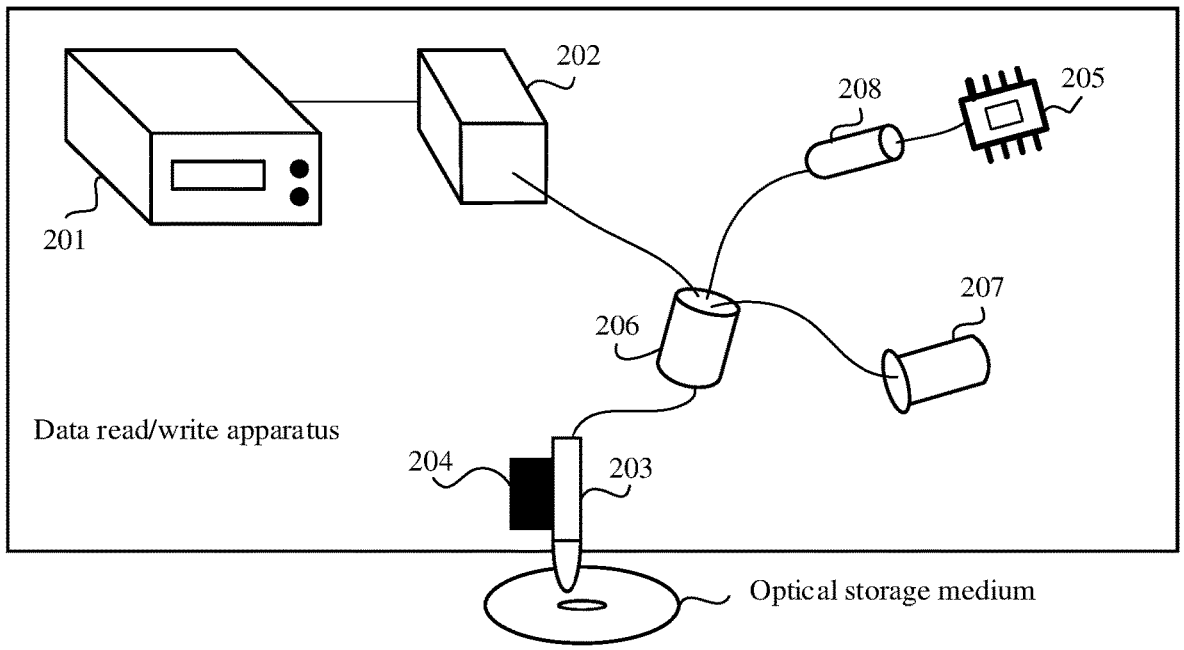
FIG. 6 is an example fifth schematic diagram of a structure of a data read/write apparatus according to an embodiment of this application.

With reference to FIG. 4, as shown in FIG. 6, in an implementation, the data read/write apparatus provided in this embodiment of this application further includes an isolator 208. The isolator 208 is connected to the second laser 205 and the optical fiber coupler 206 by using optical fibers. The isolator 208 is configured to prevent the first fluorescent signal from being transmitted to the second laser.

In this embodiment of this application, in a data read process, the first fluorescent signal collected by using the optical fiber lens 203 needs to enter the detector 207, and if the first fluorescent signal is reflected to the second laser 205, the second laser 205 may be damaged. The isolator 208 is connected to one end of the second laser 205 to prevent the first fluorescent signal from entering the second laser 205, thereby ensuring safe running of the second laser 205.

Figure 7:
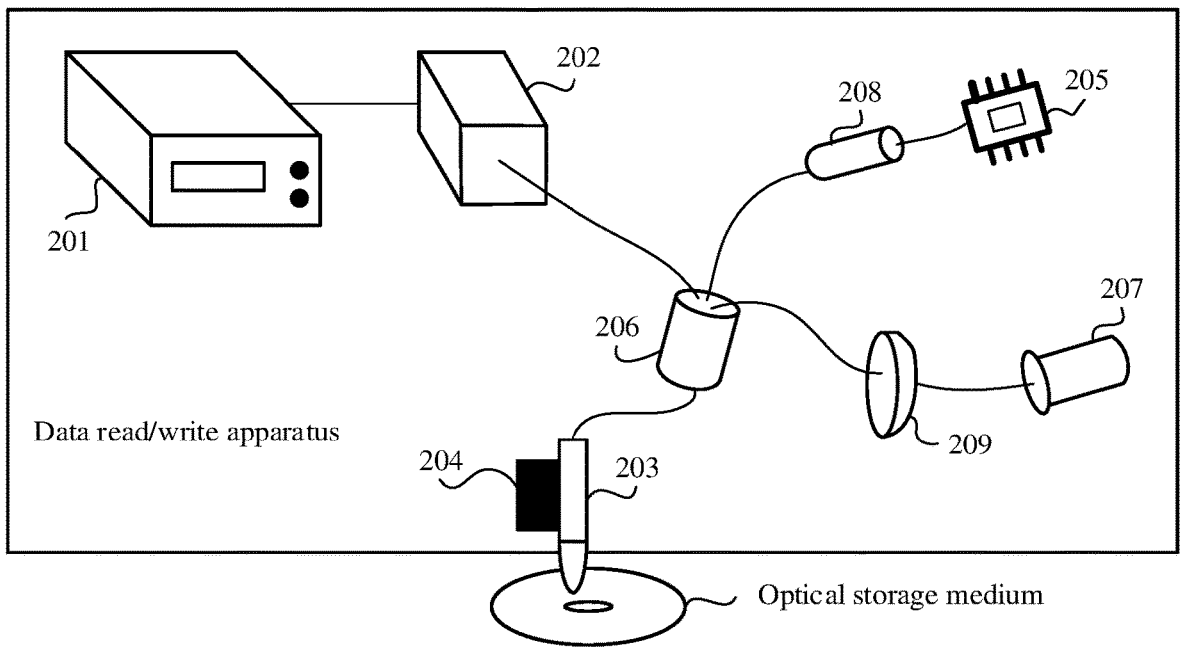
FIG. 7 is an example sixth schematic diagram of a structure of a data read/write apparatus according to an embodiment of this application.

With reference to FIG. 6, as shown in FIG. 7, in an implementation, the data read/write apparatus provided in this embodiment of this application further includes a band-pass filter 209. The band-pass filter 209 is connected to the detector 207 and the optical fiber coupler 206 separately. The band-pass filter 209 is configured to receive the first fluorescent signal and filter the first fluorescent signal. The detector 207 is specifically configured to detect light intensity of the filtered first fluorescent signal, to obtain the to-be-read data.

In this embodiment of this application, a filtering band of the band-pass filter 209 is 600-700 nm. Stray light and reflected light whose wavelengths are outside the 600-700 nm band can be filtered out by using the band-pass filter 209, thereby increasing a signal-to-noise ratio of the first fluorescent signal, so that the to-be-read data detected by the detector 207 is more accurate.

The embodiments of this application provide the data read/write apparatus. The first laser in the data read/write apparatus outputs the first optical pulse based on the control signal, where the first optical pulse is the signal obtained based on the to-be-written data. Then, the dispersion compensator performs dispersion compensation on the first optical pulse and outputs the second optical pulse. Further, the optical fiber lens connected to the dispersion compensator focuses the second optical pulse onto the optical storage medium, to write the to-be-written data to the optical storage medium. Components in the data read/write apparatus are optical fiber components, and the optical fiber components are connected through coupling by using optical fibers. Because the optical fiber components are insensitive to an external environment, and can work stably in a harsh environment, reading/writing data by using the data read/write apparatus can improve data read/write performance.

Further, the foregoing components are connected by using the optical fibers, so that an optical path is highly integrated, and a size of the data read/write apparatus is less than a size of a conventional data read/write apparatus constructed by using optical components.

Figure 8:
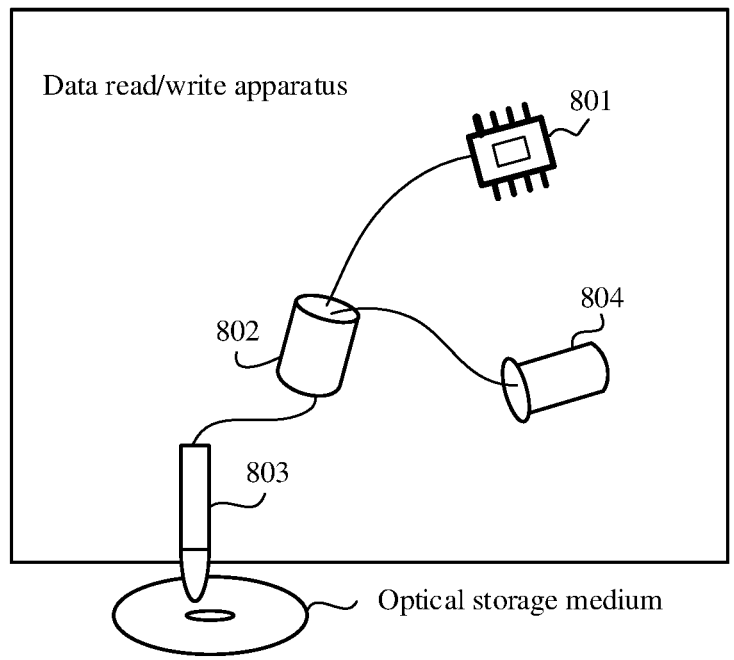
FIG. 8 is an example seventh schematic diagram of a structure of a data read/write apparatus according to an embodiment of this application.

As shown in FIG. 8, an embodiment of this application provides a data read/write apparatus, configured to read data. The data read/write apparatus includes a second laser 801, an optical fiber coupler 802, an optical fiber lens 803, and a detector 804. The optical fiber coupler 802 is connected to the second laser 801, the optical fiber lens 803, and the detector 804 by using optical fibers. The second laser 801 is configured to output first continuous laser light. The optical fiber lens 803 is configured to: receive the first continuous laser light, focus the first continuous laser light onto an optical storage medium, and receive a first fluorescent signal generated by the optical storage medium based on the first continuous laser light, where the first fluorescent signal is used to indicate to-be-read data. The detector 804 is configured to detect light intensity of the first fluorescent signal, to obtain the to-be-read data.

Optionally, the optical fiber coupler 802 may be a 1×2 optical fiber coupler. A port at a first end of the optical fiber coupler 802 is connected to the optical fiber lens 803, the first port at a second end of the optical fiber coupler 802 is connected to the second laser 801, and the second port at the second end is connected to the detector 804.

It should be noted that the optical fiber coupler 802 may alternatively be an optical fiber coupler of another specification (for example, a 1×N optical fiber coupler). Optical fiber couplers of different specifications are selected based on specific requirements. This is not limited in this embodiment of this application.

Data stored in the optical storage medium (a transparent optical disc) can be read by using the data read/write apparatus provided in this embodiment of this application. It should be noted that how the data stored in the optical storage medium is written is not limited in this embodiment of this application. For a detailed process of reading data by the data read/write apparatus and descriptions of the second laser 801, the optical fiber lens 803, and the detector 804 in the data read/write apparatus, refer to related descriptions in the foregoing embodiments.

Figure 9:
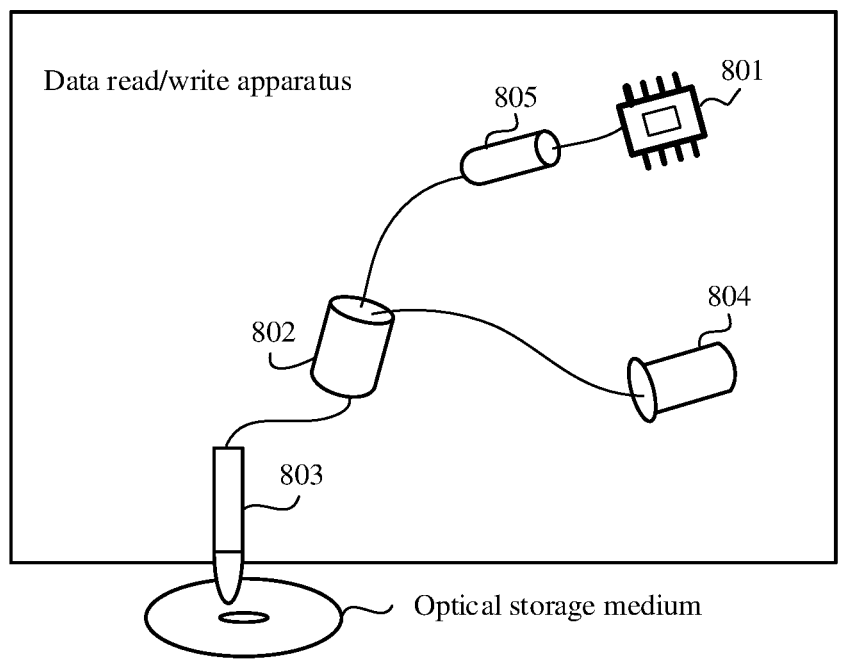
FIG. 9 is an example eighth schematic diagram of a structure of a data read/write apparatus according to an embodiment of this application.

With reference to FIG. 8, as shown in FIG. 9, in an implementation, the data read/write apparatus provided in this embodiment of this application further includes an isolator 805. The isolator 805 is connected to the second laser 801 and the optical fiber coupler 802 by using optical fibers. The isolator 805 is configured to prevent the first fluorescent signal from being transmitted to the second laser 801.

In this embodiment of this application, if the first fluorescent signal is reflected to the second laser 801, the second laser 801 may be damaged. The isolator 805 is connected to one end of the second laser 801 to prevent the first fluorescent signal from entering the second laser 801, thereby ensuring safe running of the second laser 801.

Figure 10:
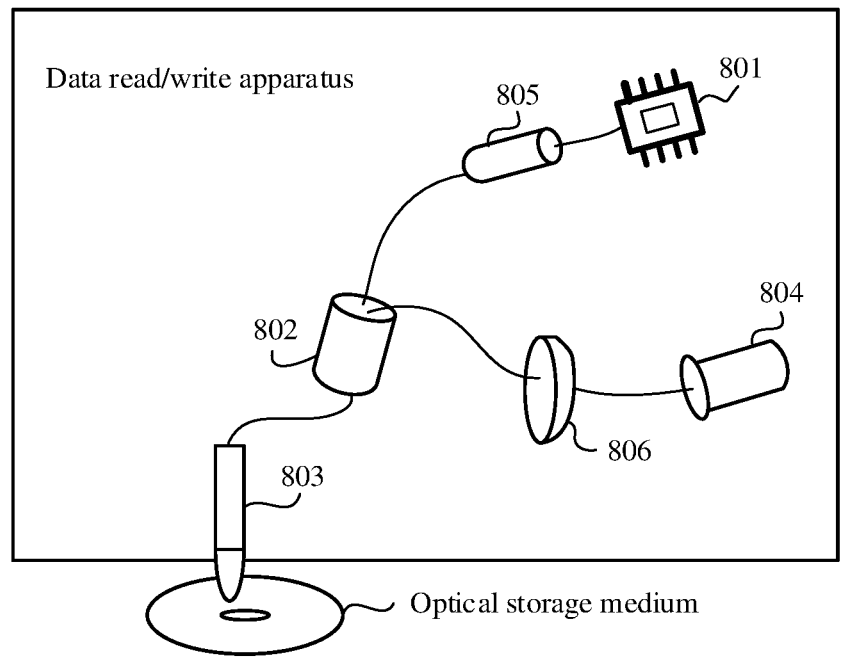
FIG. 10 is an example ninth schematic diagram of a structure of a data read/write apparatus according to an embodiment of this application.

With reference to FIG. 9, as shown in FIG. 10, in an implementation, the data read/write apparatus provided in this embodiment of this application further includes a band-pass filter 806. The band-pass filter 806 is connected to the detector 804 and the optical fiber coupler 802 separately. The band-pass filter 806 is configured to receive the first fluorescent signal and filter the first fluorescent signal. The detector 804 is specifically configured to detect light intensity of the filtered first fluorescent signal, to obtain the to-be-read data.

The band-pass filter 806 can filter out stray light and reflected light in the first fluorescent signal, thereby increasing a signal-to-noise ratio of the first fluorescent signal, so that the to-be-read data detected by the detector 804 is more accurate.

Figure 11:
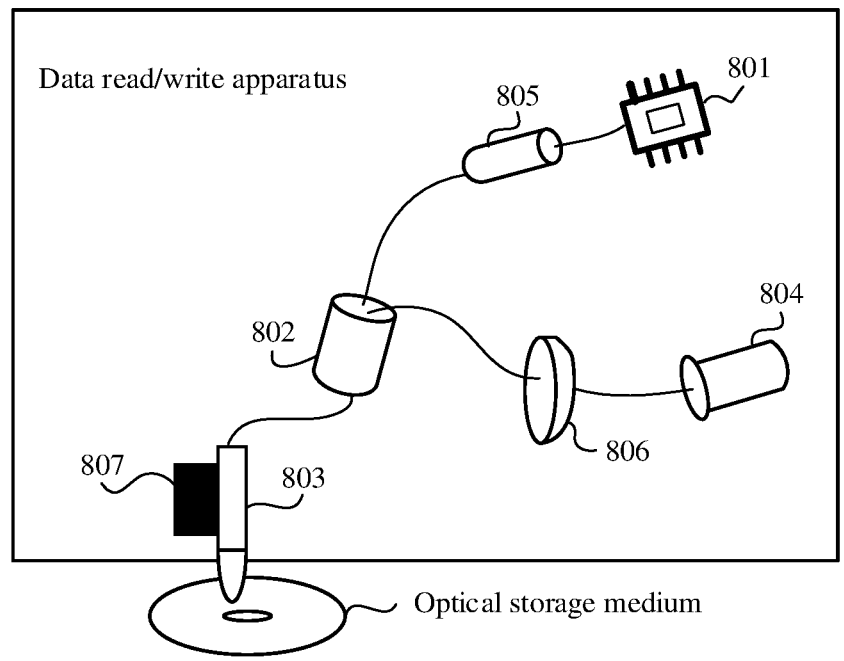
FIG. 11 is an example tenth schematic diagram of a structure of a data read/write apparatus according to an embodiment of this application.

With reference to FIG. 10, as shown in FIG. 11, in an implementation, the data read/write apparatus provided in this embodiment of this application further includes a piezoelectric actuator 807, configured to drive the optical fiber lens 803 to move, so as to adjust a location of the optical fiber lens 803. The location of the optical fiber lens 803 corresponds to a location of a data recording point on the optical storage medium.

The piezoelectric actuator 807 may drive the optical fiber lens 803 to move in three-dimensional space, so as to adjust the location of the optical fiber lens 803, thereby reading data recorded at data recording points at different locations on the optical storage medium.

For other descriptions of the isolator 805, the band-pass filter 806, and the piezoelectric actuator 807, refer to content of the foregoing embodiments.

This embodiment of this application provides the data read/write apparatus. The optical fiber lens in the data read/write apparatus focuses, onto the optical storage medium, the first continuous laser light output by the second laser, and receives the first fluorescent signal generated by the optical storage medium based on the first continuous laser light. The first fluorescent signal is used to indicate the to-be-read data. Further, the light intensity of the first fluorescent signal is detected by using the detector, to obtain the to-be-read data. Components in the data read/write apparatus are optical fiber components, and the optical fiber components are connected through coupling by using optical fibers. Because the optical fiber components are insensitive to an external environment, and can work stably in a harsh environment, reading/writing data by using the data read/write apparatus can improve data read/write performance.

Further, the foregoing components are connected by using the optical fibers, so that an optical path is highly integrated, and a size of the data read/write apparatus is less than a size of a conventional data read/write apparatus constructed by using optical components.

Figure 12:
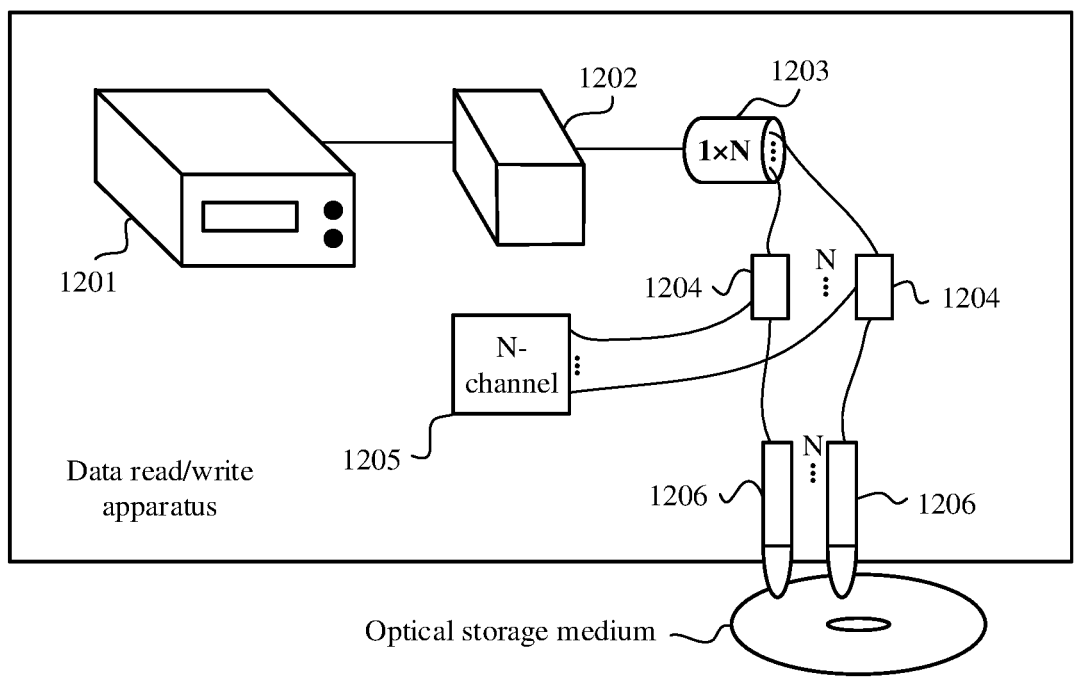
FIG. 12 is an example eleventh schematic diagram of a structure of a data read/write apparatus according to an embodiment of this application.

Further, an embodiment of this application provides a data read/write apparatus, which may be configured to perform parallel data write and parallel data read. As shown in FIG. 12, the data read/write apparatus includes a first laser 1201, a dispersion compensator 1202, a first optical fiber coupler 1203, N optical switches 1204, an N-channel photoelectric controller 1205, and N optical fiber lenses 1206. The first optical fiber coupler 1203 is connected to the N optical switches 1204 by using optical fibers. The N-channel photoelectric controller 1205 is connected to the N optical switches 1204 separately. The N optical switches 1204 are correspondingly connected to the N optical fiber lenses 1206 by using optical fibers. N is a positive integer greater than or equal to 2. The first laser 1201 is configured to output a first optical pulse. The dispersion compensator 1202 is configured to perform dispersion compensation on the first optical pulse to output a second optical pulse. The first optical fiber coupler 1203 is connected to the dispersion compensator 1202 by using an optical fiber, and is configured to split the second optical pulse into N beams of optical pulses. The N-channel photoelectric controller 1205 is configured to control states of the N optical switches 1204 based on N control signals, to adjust light intensity of the N beams of optical pulses. The N control signals are signals respectively obtained based on N pieces of to-be-written data. The N beams of optical pulses are used to indicate the N pieces of to-be-written data. The N optical fiber lenses 1206 are configured to focus the N beams of optical pulses onto an optical storage medium, to write the N pieces of to-be-written data to the optical storage medium. The N optical fiber lenses are in one-to-one correspondences with the N beams of optical pulses.

The first optical fiber coupler 1203 is a 1×N optical fiber coupler, and the first optical fiber coupler is used as a beam splitter. When there are a plurality of pieces to-be-written data, the first optical fiber coupler 1203 splits the first optical pulse into N identical optical pulses.

In this embodiment of this application, an optical path control module in an optical storage system generates the N control signals based on the N pieces of to-be-written data respectively, and inputs the N control signals to the N-channel photoelectric controller 1205. The N-channel photoelectric controller 1205 controls switch states of the N optical switches 1204 based on the N control signals respectively, to adjust light intensity of the N optical pulses, so as to adjust the N optical pulses to optical pulses corresponding to the N pieces of to-be-written data. A switch state of an optical switch refers to a closing extent of the optical switch. For example, the N-channel photoelectric controller controls a closing extent of the first optical switch to be 80%, and controls a closing extent of the second optical switch to be 50%, so that light intensity of an optical pulse output by the first optical switch is different from light intensity of an optical pulse output by the second optical switch.

Further, each of the N optical fiber lenses 1206 focuses one corresponding beam of optical pulse (in the N beams of optical pulses) onto the optical storage medium, so as to write the group of to-be-written data to the optical storage medium. For example, the first optical fiber lens is configured to focus an optical pulse (which may also be referred to as the first beam of optical pulse) output by the first optical switch onto the optical storage medium, the second optical fiber lens is configured to focus an optical pulse (which may also be referred to as the second beam of optical pulse) output by the second optical switch onto the optical storage medium, and so on. The $N^{th}$ optical fiber lens is configured to focus an optical pulse (which may also be referred to as the $N^{th}$ beam of optical pulse) output by the $N^{th}$ optical switch onto the optical storage medium. In this way, the N pieces of data are written to the optical storage medium in parallel, thereby significantly improving data write efficiency.

Similar to those in the data read/write apparatus shown in FIG. 1, the first laser 1201 may be a femtosecond laser or a picosecond laser, the dispersion compensator 1202 may include a chirp compensator, and the N optical fiber lenses 1206 may be GRIN fiber lenses. For specific descriptions of the components, refer to related descriptions in the foregoing embodiments.

Figure 13:
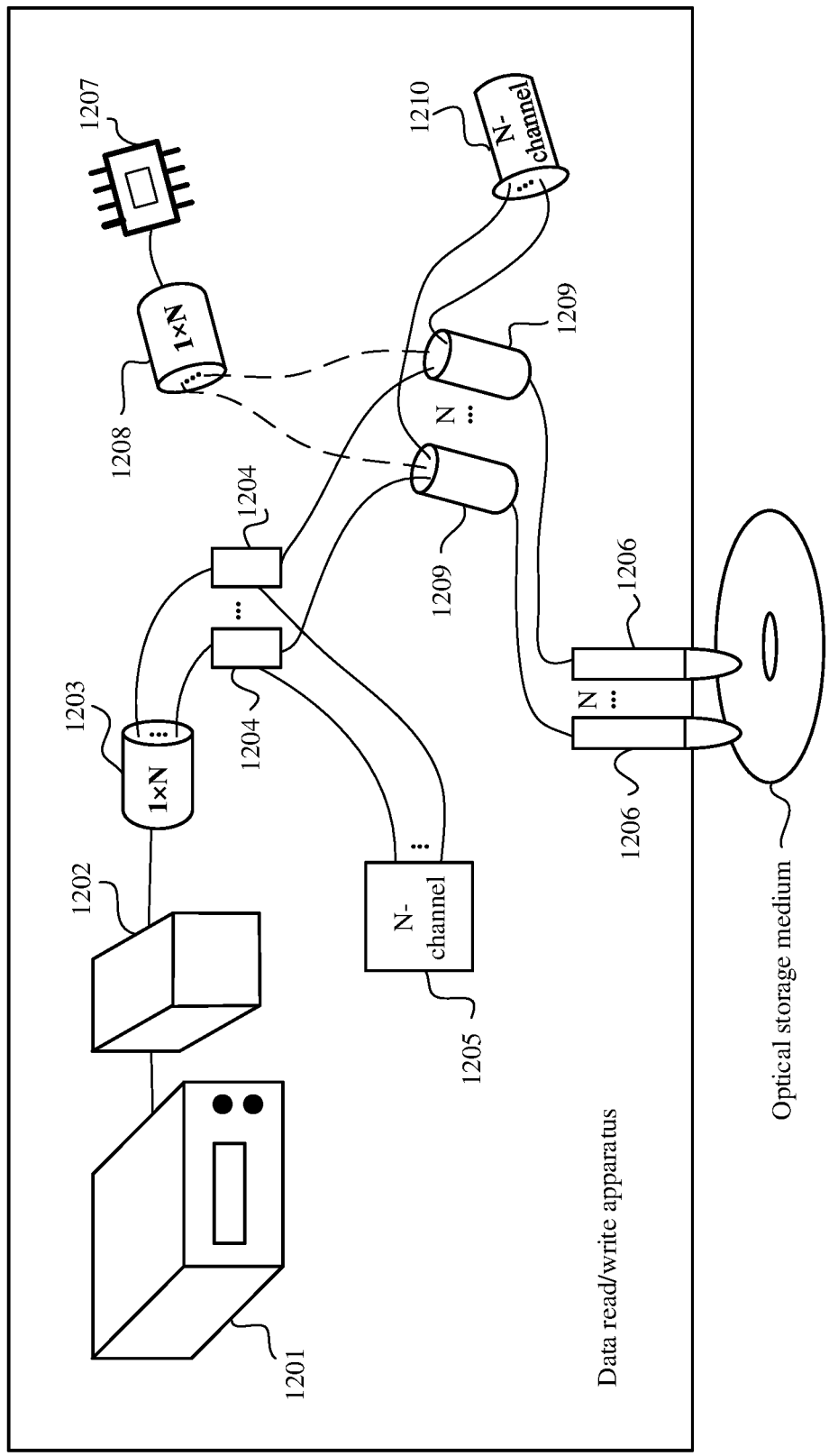
FIG. 13 is an example twelfth schematic diagram of a structure of a data read/write apparatus according to an embodiment of this application.

With reference to FIG. 12, as shown in FIG. 13, in an implementation, the data read/write apparatus provided in this embodiment of this application further includes a second laser 1207, a second optical fiber coupler 1208, N third optical fiber couplers 1209, and an N-channel detector 1210. The N third optical fiber couplers 1209 are connected to the second optical fiber coupler 1208, the N optical fiber lenses 1206, and the N-channel detector 1210 by using optical fibers. The second laser 1207 is configured to output first continuous laser light. The second optical fiber coupler 1208 is connected to the second laser 1207 by using an optical fiber, and is configured to split the first continuous laser light into N beams of continuous laser light. The N optical fiber lenses 1206 are further configured to: receive the N beams of continuous laser light, focus the N beams of continuous laser light onto the optical storage medium, and receive N fluorescent signals generated by the optical storage medium based on the N beams of continuous laser light. The N optical fiber lenses 1206 are in one-to-one correspondences with the N beams of continuous laser light. The N fluorescent signals are respectively used to indicate N pieces of to-be-read data. The N-channel detector 1210 is configured to detect light intensity of the N fluorescent signals separately, to obtain the N pieces of to-be-read data.

All of the N third optical fiber couplers 1209 are 1×3 optical fiber couplers. Using the first third optical fiber coupler as an example, a port at a first end of the third optical fiber coupler 1209 is connected to the first optical fiber lens 1206, the first port at a second end is connected to the dispersion compensator 1202, the second port at the second end is connected to the second laser 1207, and the third port at the second end is connected to the N-channel detector 1210.

Figure 14:
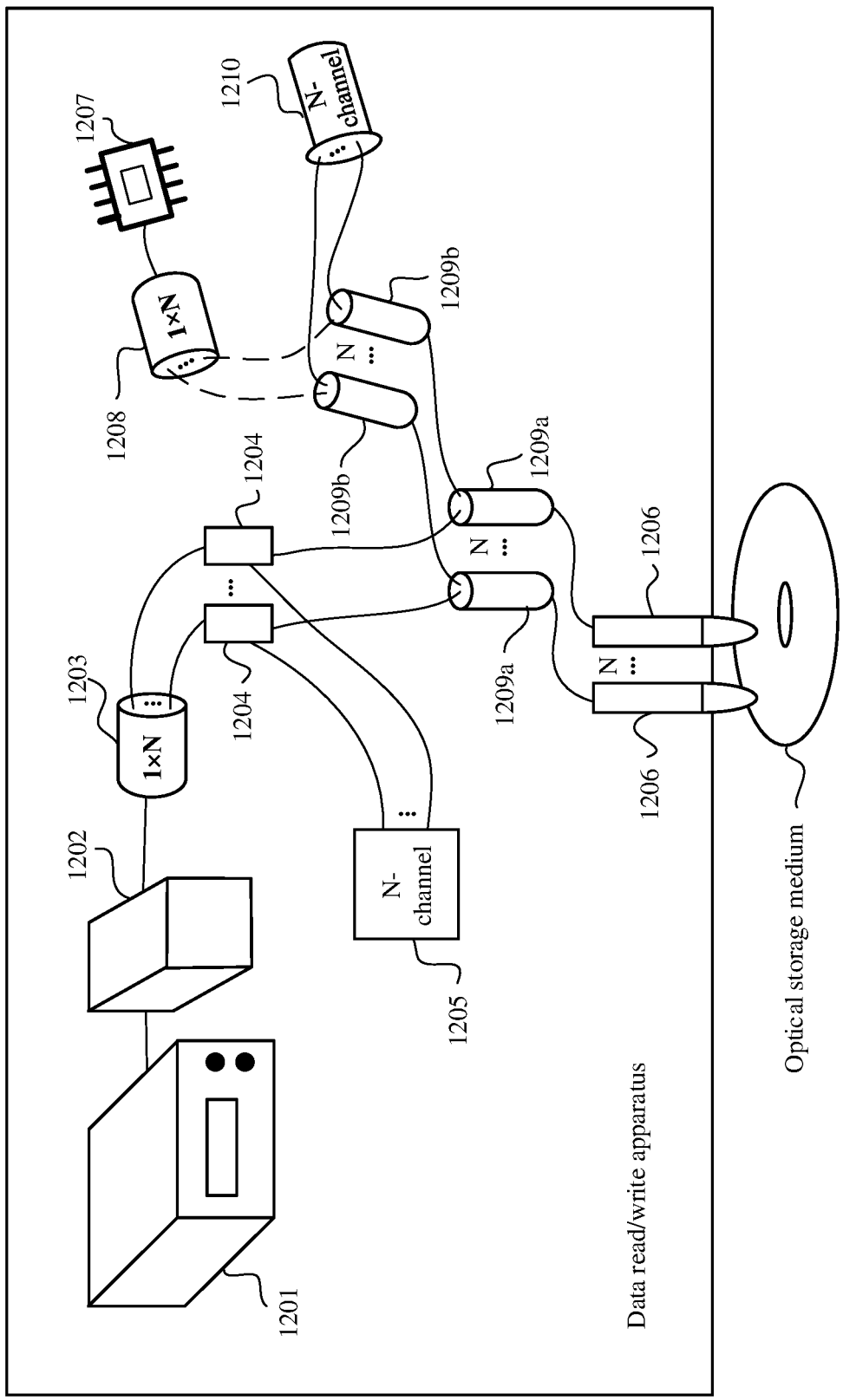
FIG. 14 is an example thirteenth schematic diagram of a structure of a data read/write apparatus according to an embodiment of this application.

Optionally, the data read/write apparatus provided in this embodiment of this application may alternatively include 2*N 1×2 third optical fiber couplers. The 2*N third optical fiber couplers are divided into two groups, and each group includes N third optical fiber couplers. N third optical fiber couplers in a first group are in one-to-one correspondences with N third optical fiber couplers in a second group. Specifically, using the first third optical fiber coupler in the first group and the first third optical fiber coupler in the second group as an example, as shown in FIG. 14, a first end of a third optical fiber coupler 1209a is connected to the first optical fiber lens 1206, the first port at a second end of the third optical fiber coupler 1209a is connected to the dispersion compensator 1202, a first end of a third optical fiber coupler 1209b is connected to the second port at the second end of the third optical fiber coupler 1209a, the first port at a second end of the third optical fiber coupler 1209b is connected to the second laser 1207, and the second port at the second end of the third optical fiber coupler 1209b is connected to the N-channel detector 1210.

Specifically, each of the N optical fiber lenses 1206 focuses one corresponding beam of continuous laser light (in the N beams of continuous laser light) onto the optical storage medium, receives a fluorescent signal corresponding to the one beam of continuous laser light, and then transmits the fluorescent signal to one channel in the N-channel detector 1210.

With the data read/write apparatus, N pieces of data can be read from the optical storage medium in parallel, thereby significantly improving data read efficiency.

Figure 15:
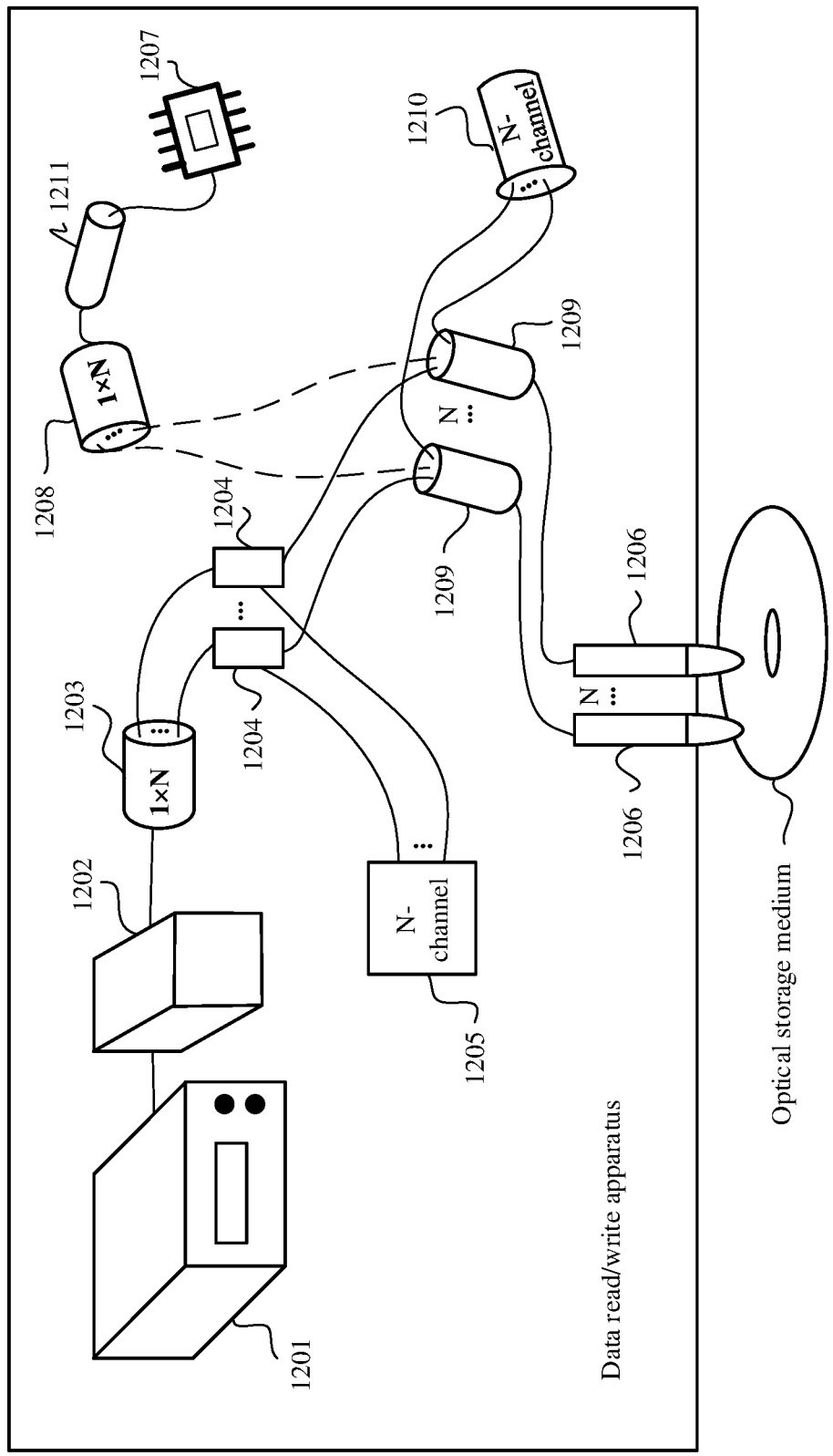
FIG. 15 is an example fourteenth schematic diagram of a structure of a data read/write apparatus according to an embodiment of this application.

With reference to FIG. 13, as shown in FIG. 15, in an implementation, the data read/write apparatus provided in this embodiment of this application further includes an isolator 1211. The isolator 1211 is connected to the second laser 1207 and the second optical fiber coupler 1208 by using optical fibers. The isolator 1211 is configured to prevent the N fluorescent signals from being transmitted to the second laser.

Similarly, the isolator 1211 can prevent the N fluorescent signals from entering the second laser 1207, and can ensure that the second laser 1207 is not damaged by the fluorescent signals.

Figure 16:
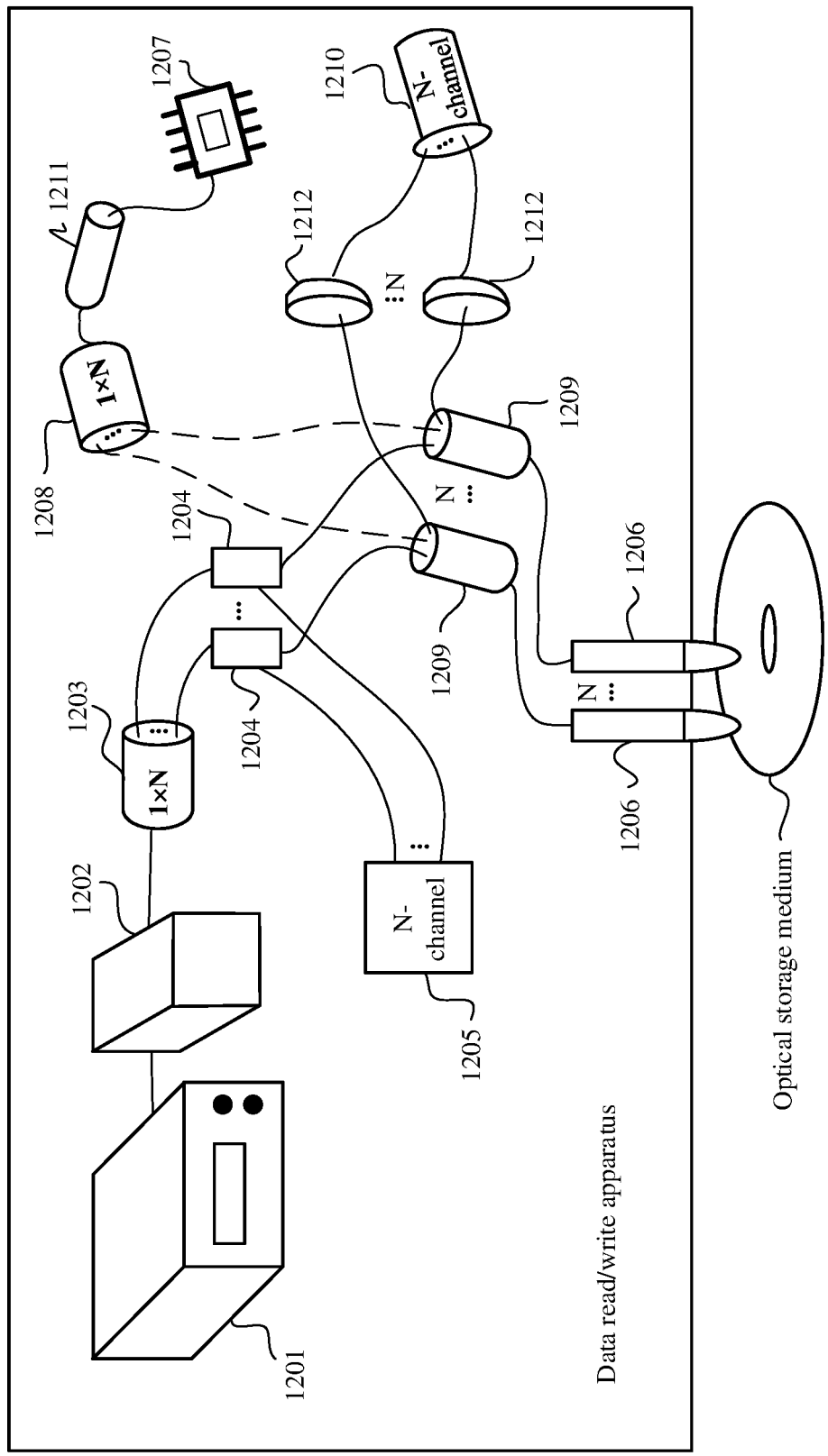
FIG. 16 is an example fifteenth schematic diagram of a structure of a data read/write apparatus according to an embodiment of this application.

With reference to FIG. 15, as shown in FIG. 16, in an implementation, the data read/write apparatus provided in this embodiment of this application further includes N band-pass filters 1212. The N band-pass filters 1212 are connected to the N-channel detector 1210 and the N third optical fiber couplers 1209 by using optical fibers. The band-pass filters 1212 are configured to: receive the N fluorescent signals respectively output by the N optical fiber lenses 1206, and filter the N fluorescent signals. The N band-pass filters are in one-to-one correspondences with the N fluorescent signals. The N-channel detector 1210 is specifically configured to detect light intensity of the N filtered fluorescent signals separately, to obtain the N pieces of to-be-read data.

The N band-pass filters 1212 can respectively filter out stray light and reflected light in the N fluorescent signals, thereby increasing signal-to-noise ratios of the N fluorescent signals, and improving accuracy of read data.

Figure 17:
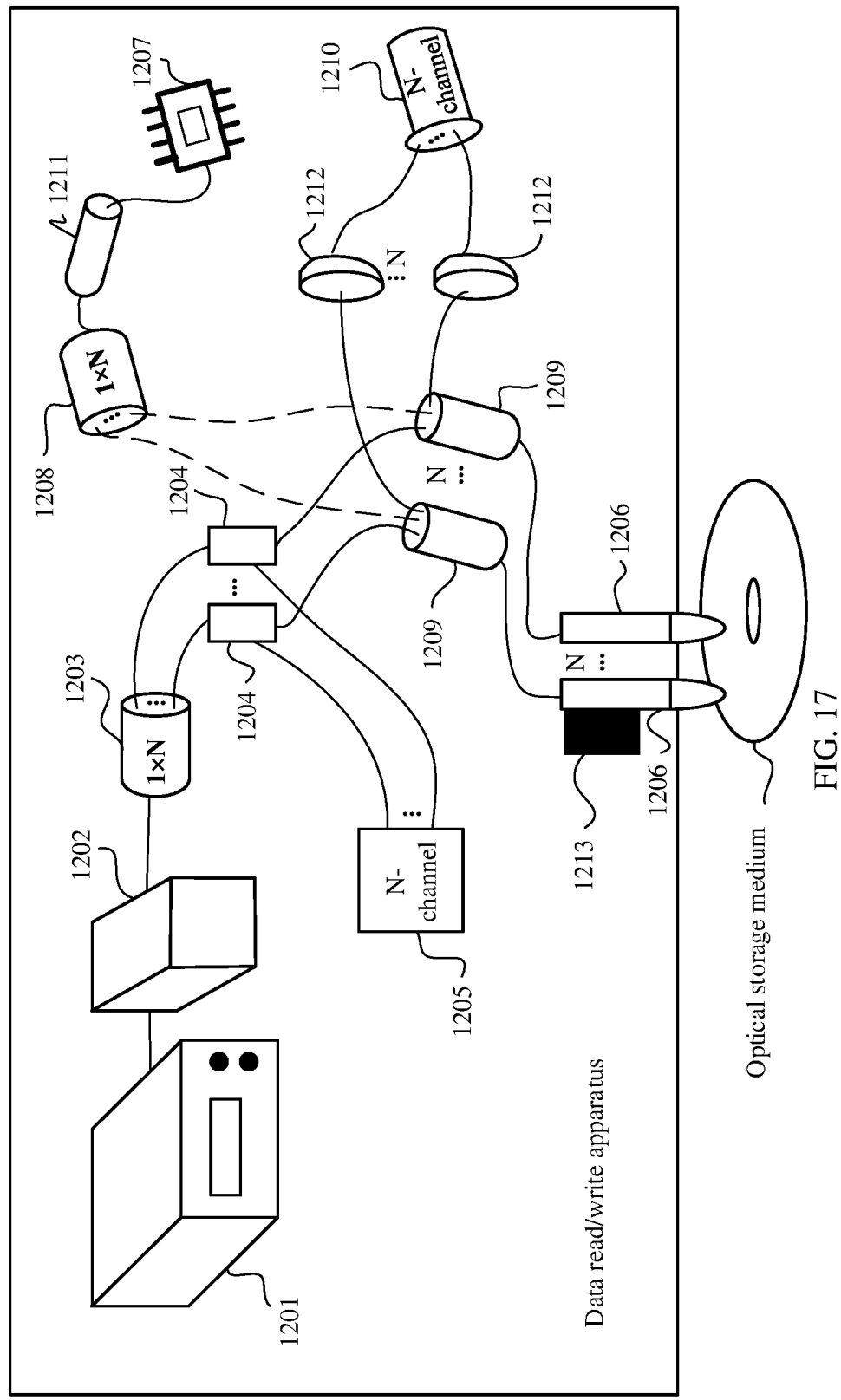
FIG. 17 is an example sixteenth schematic diagram of a structure of a data read/write apparatus according to an embodiment of this application.

With reference to FIG. 16, as shown in FIG. 17, in an implementation, the data read/write apparatus provided in this embodiment of this application further includes a piezoelectric actuator 1213. The piezoelectric actuator 1213 is configured to drive the N optical fiber lenses 1206 to move, so as to adjust locations of the N optical fiber lenses 1206. The locations of the N optical fiber lenses 1206 respectively correspond to locations of different data recording points on the optical storage medium.

The piezoelectric actuator 1213 may drive the N optical fiber lenses 1206 to move in three-dimensional space, so as to adjust the locations of the N optical fiber lenses 1206, thereby writing data to data recording points at different locations on the optical storage medium or reading data recorded at data recording points at different locations on the optical storage medium. It should be noted that the data read/write apparatus in this embodiment of this application includes one piezoelectric actuator, and the piezoelectric actuator can simultaneously drive the N optical fiber lenses to move along a same direction. Optionally, the N optical fiber lenses may be fastened together, and the piezoelectric actuator is fastened to one side of the optical fiber lenses.

It should be noted that, for other descriptions of the isolator 1211, the band-pass filters 1212, and the piezoelectric actuator 1213, refer to related descriptions in the foregoing embodiments.

Figure 18:
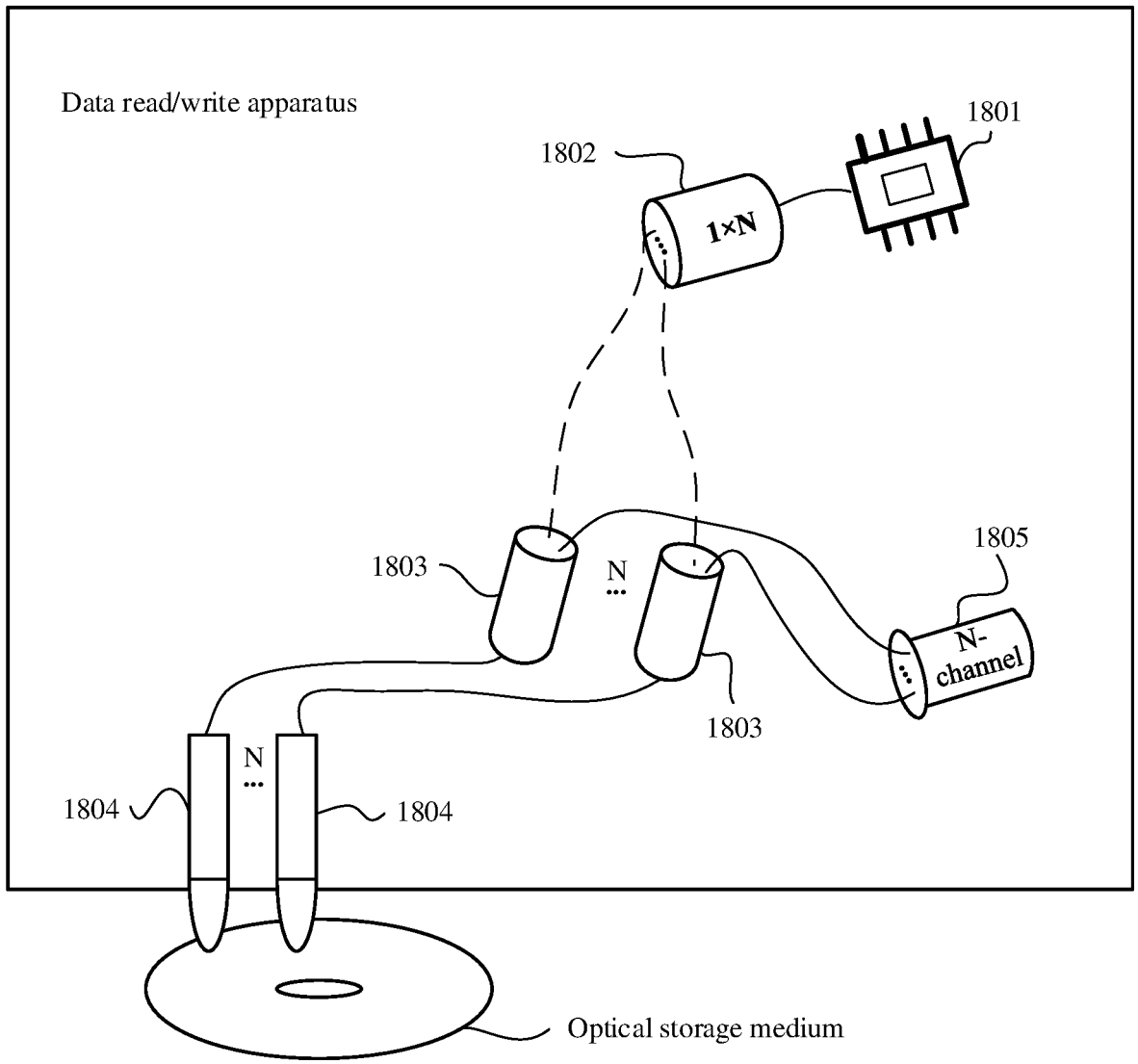
FIG. 18 is an example seventeenth schematic diagram of a structure of a data read/write apparatus according to an embodiment of this application.

As shown in FIG. 18, an embodiment of this application provides a data read/write apparatus, which may be configured to perform parallel data read. The data read/write apparatus includes a second laser 1801, a second optical fiber coupler 1802, N third optical fiber couplers 1803, N optical fiber lenses 1804, and an N-channel detector 1805. The N third optical fiber couplers 1803 are connected to the second optical fiber coupler 1802, the N optical fiber lenses 1804, and the N-channel detector 1805 by using optical fibers. The second laser 1801 is configured to output first continuous laser light. The second optical fiber coupler 1802 is connected to the second laser 1801 by using an optical fiber, and is configured to split the first continuous laser light into N beams of continuous laser light. The N optical fiber lenses 1804 are configured to: receive the N beams of continuous laser light, focus the N beams of continuous laser light onto an optical storage medium, and receive N fluorescent signals generated by the optical storage medium based on the N beams of continuous laser light. The N optical fiber lenses 1804 are in one-to-one correspondences with the N beams of continuous laser light. The N fluorescent signals are respectively used to indicate N pieces of to-be-read data. The N-channel detector 1805 is configured to detect light intensity of the N fluorescent signals separately, to obtain the N pieces of to-be-read data.

Optionally, all of the N third optical fiber couplers 1803 may be 1×2 optical fiber couplers. For example, a port at a first end of the first third optical fiber coupler 1803 is connected to the first optical fiber lens 1804, the first port at a second end is connected to the second laser 1801, and the second port at the second end is connected to the N-channel detector 1805.

It should be noted that the third optical fiber coupler 1803 may alternatively be an optical fiber coupler of another specification (for example, a 1×N optical fiber coupler). Optical fiber couplers of different specifications are selected based on specific requirements. This is not limited in this embodiment of this application.

With the data read/write apparatus provided in this embodiment of this application, N pieces of data stored in the optical storage medium (a transparent optical disc) can be read in parallel, thereby significantly improving data read efficiency.

It should be noted that how data stored in the optical storage medium is written is not limited in this embodiment of this application. For a detailed process of reading data by the data read/write apparatus and descriptions of the second laser 1801, the N optical fiber lenses 1804, and the N-channel detector 1805 in the data read/write apparatus, refer to related descriptions in the foregoing embodiments.

Figure 19:
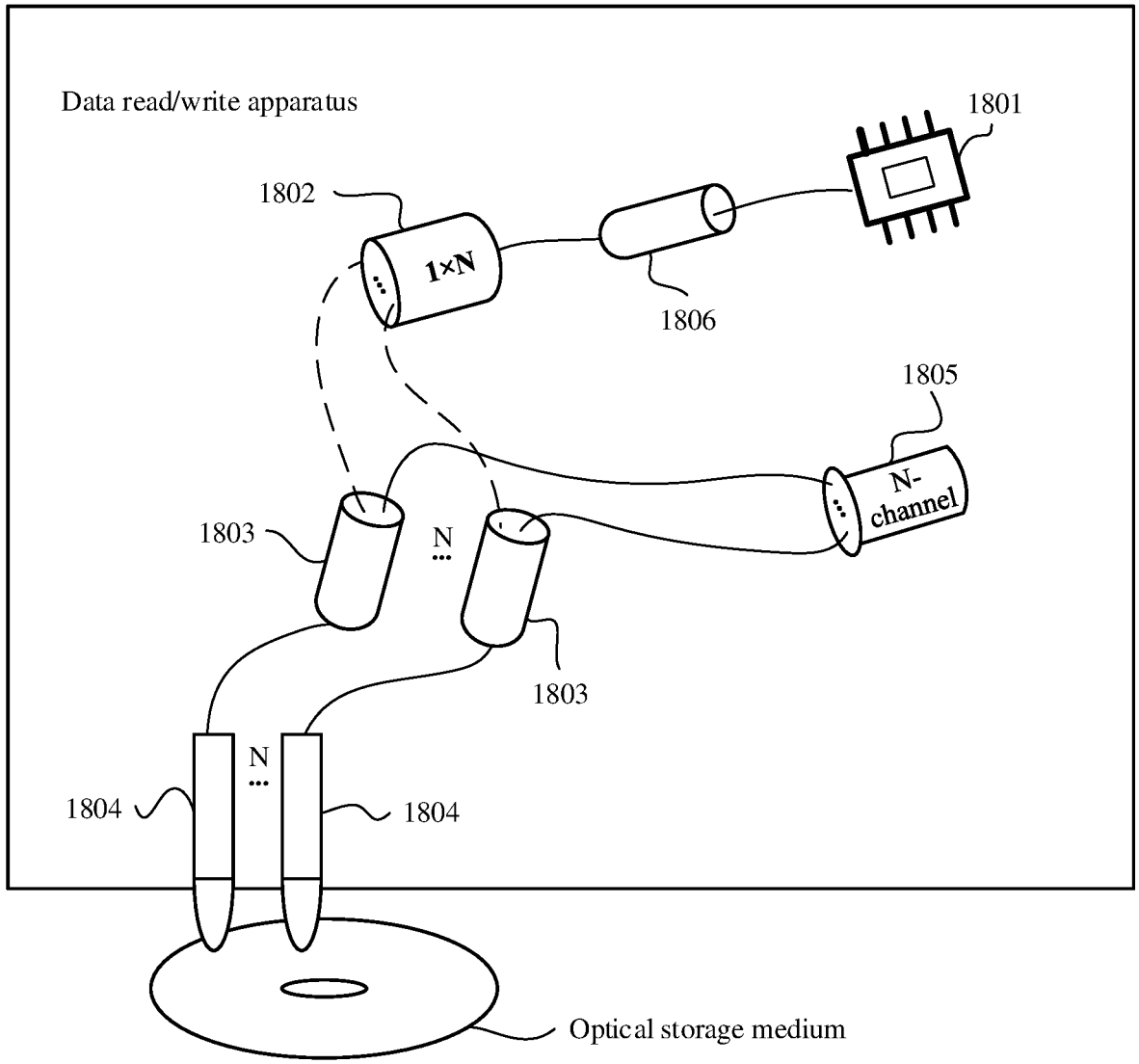
FIG. 19 is an example eighteenth schematic diagram of a structure of a data read/write apparatus according to an embodiment of this application.

With reference to FIG. 18, as shown in FIG. 19, in an implementation, the data read/write apparatus provided in this embodiment of this application further includes an isolator 1806. The isolator 1806 is connected to the second laser 1801 and the second optical fiber coupler 1802 by using optical fibers. The isolator 1806 is configured to prevent the N fluorescent signals from being transmitted to the second laser 1801.

Similarly, the isolator 1806 can prevent the N fluorescent signals from entering the second laser 1801, and can ensure that the second laser 1801 is not damaged by the fluorescent signals.

Figure 20:
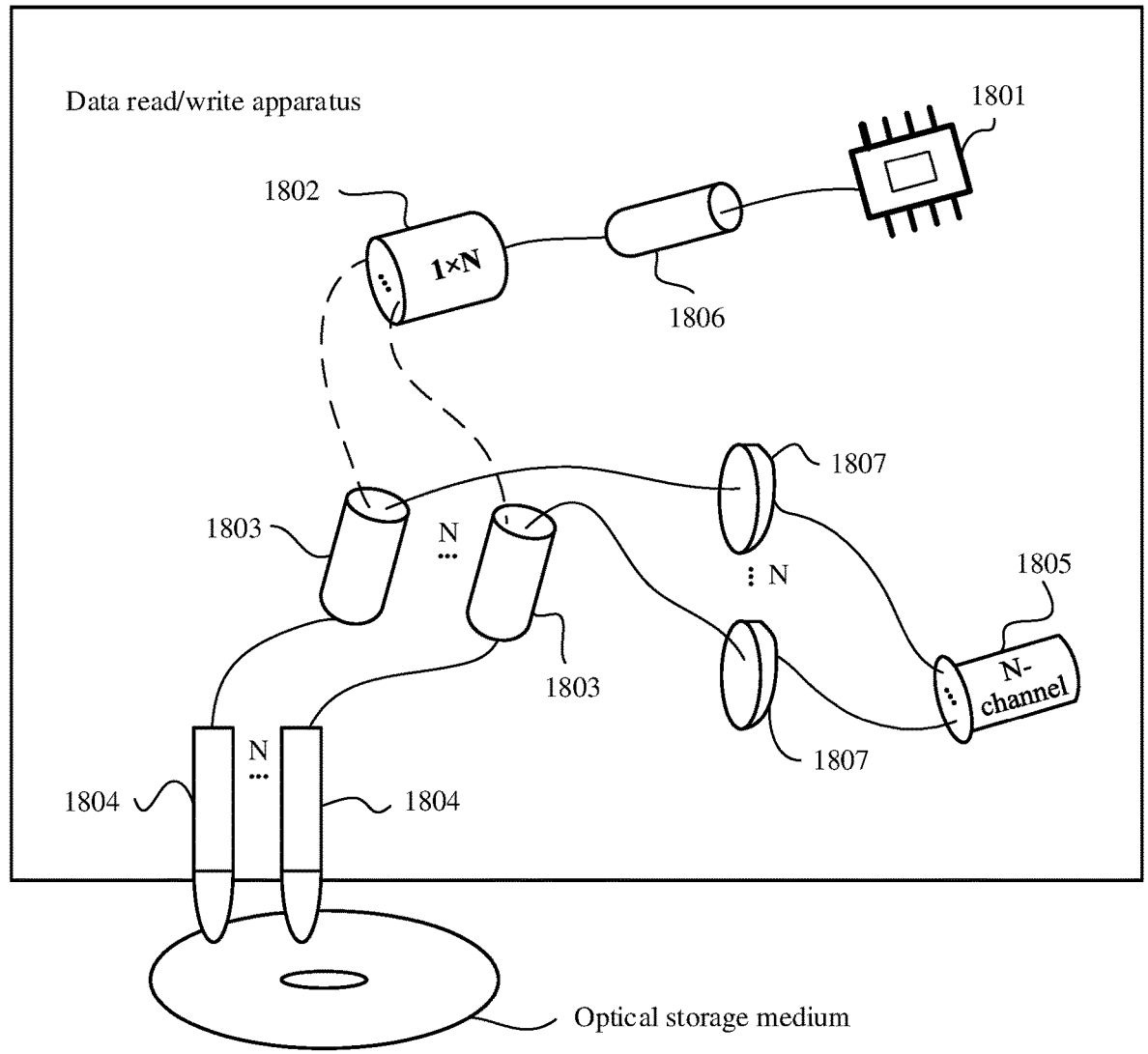
FIG. 20 is an example nineteenth schematic diagram of a structure of a data read/write apparatus according to an embodiment of this application.

With reference to FIG. 19, as shown in FIG. 20, in an implementation, the data read/write apparatus provided in this embodiment of this application further includes N band-pass filters 1807. The N band-pass filters 1807 are connected to the N-channel detector 1805 and the N third optical fiber couplers 1803 by using optical fibers. The band-pass filters 1807 are configured to: receive the N fluorescent signals and filter the N fluorescent signals. The N band-pass filters are in one-to-one correspondences with the N fluorescent signals. The N-channel detector 1805 is specifically configured to detect light intensity of the N filtered fluorescent signals separately, to obtain the N pieces of to-be-read data.

The N band-pass filters 1807 can respectively filter out stray light and reflected light in the N fluorescent signals, thereby increasing signal-to-noise ratios of the N fluorescent signals, and improving accuracy of read data.

Figure 21:
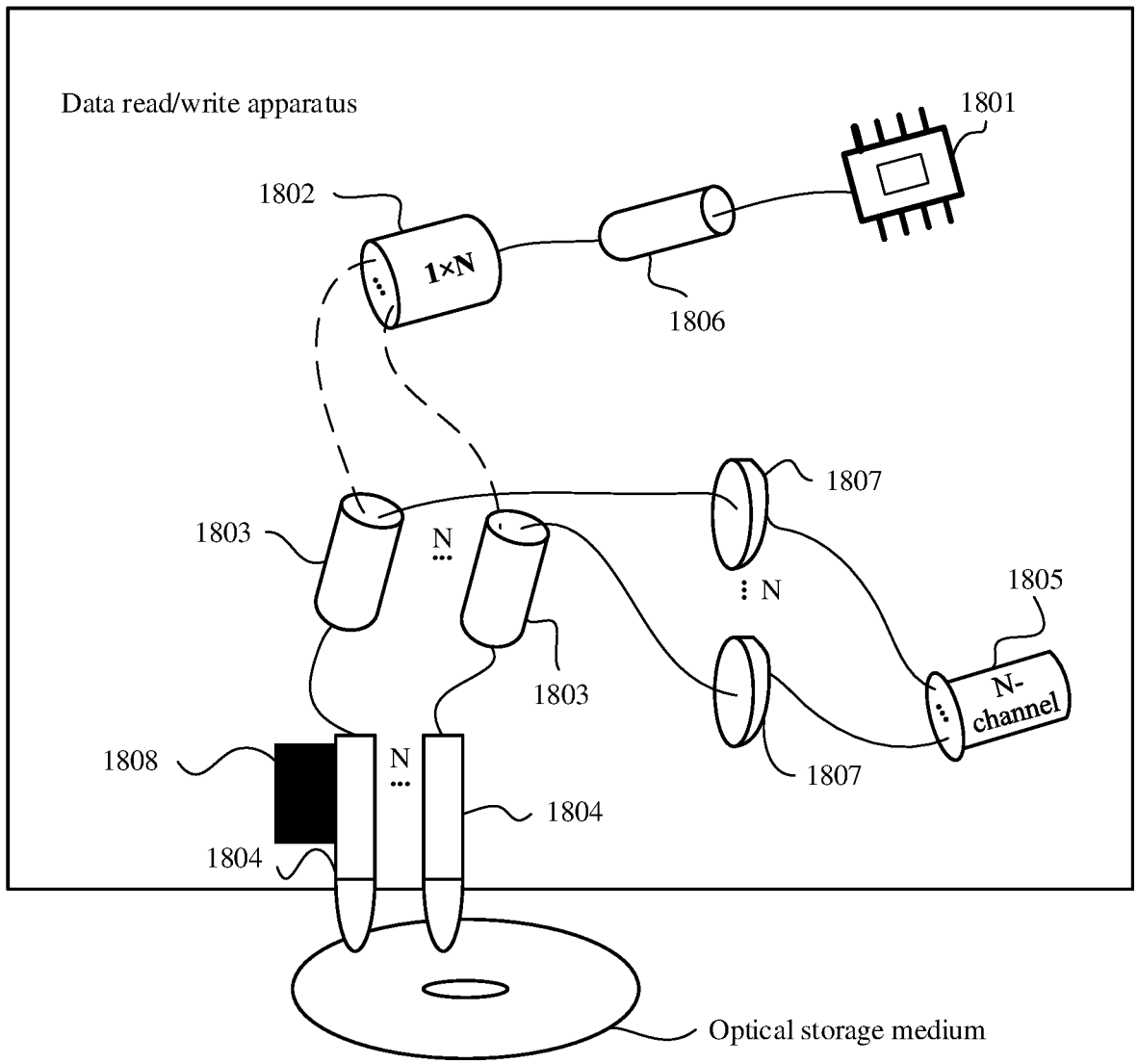
FIG. 21 is an example twentieth schematic diagram of a structure of a data read/write apparatus according to an embodiment of this application.

With reference to FIG. 20, as shown in FIG. 21, in an implementation, the data read/write apparatus provided in this embodiment of this application further includes a piezoelectric actuator 1808. The piezoelectric actuator 1808 is configured to drive the N optical fiber lenses 1804 to move, so as to adjust locations of the N optical fiber lenses 1804. The locations of the N optical fiber lenses 1804 respectively correspond to locations of different data recording points on the optical storage medium.

The piezoelectric actuator 1808 may drive the N optical fiber lenses 1804 to move in three-dimensional space, so as to adjust the locations of the N optical fiber lenses 1804, thereby reading data recorded at data recording points at different locations on the optical storage medium.

For other descriptions of the isolator 1806, the band-pass filters 1807, and the piezoelectric actuator 1808, refer to content of the foregoing embodiments.

An embodiment of this application further provides an electronic device. The electronic device includes an optical storage medium and the data read/write apparatus in FIG. 1 to FIG. 7, the data read/write apparatus in FIG. 8 to FIG. 11, the data read/write apparatus in FIG. 12 to FIG. 17, or the data read/write apparatus in FIG. 18 to FIG. 21.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A data read/write apparatus, comprising:
   a first laser, wherein
      the first laser is configured to output a first optical pulse based on a control signal, and
      the control signal is obtained based on to-be-written data;
   a dispersion compensator, wherein the dispersion compensator is configured to perform dispersion compensation on the first optical pulse to output a second optical pulse; and
   an optical fiber lens, wherein
      the optical fiber lens is connected to the dispersion compensator by using an optical fiber, and
      the optical fiber lens is configured to focus the second optical pulse onto an optical storage medium thereby writing the to-be-written data to the optical storage medium.

2. The data read/write apparatus according to claim 1, further comprising:
   a second laser;
   an optical fiber coupler; and
   a detector, wherein
      the optical fiber coupler is connected to the second laser, the optical fiber lens, and the detector by using optical fibers,
      the second laser is configured to output first continuous laser light,
      the optical fiber lens is further configured to receive the first continuous laser light, focus the first continuous laser light onto the optical storage medium, and receive a first fluorescent signal generated by the optical storage medium based on the first continuous laser light, wherein the first fluorescent signal indicates to-be-read data, and
      the detector is configured to detect light intensity of the first fluorescent signal thereby obtaining the to-be-read data.

3. The data read/write apparatus according to claim 2, further comprising:
   an isolator, wherein
      the isolator is connected to the second laser and the optical fiber coupler by using the optical fibers, and
      the isolator is configured to prevent the first fluorescent signal from being transmitted to the second laser.

4. The data read/write apparatus according to claim 1, wherein
   the first laser includes a femtosecond laser or a picosecond laser.

5. The data read/write apparatus according to claim 1, wherein
   the dispersion compensator includes a chirp compensator.

6. A data read/write apparatus, comprising:
   a laser;
   an optical fiber coupler;
   an optical fiber lens; and
   a detector, wherein
      the optical fiber coupler is connected to the laser, the optical fiber lens, and the detector by using optical fibers,
      the laser is configured to output first continuous laser light,
      the optical fiber lens is configured to receive the first continuous laser light, focus the first continuous laser light onto an optical storage medium, and receive a first fluorescent signal generated by the optical storage medium based on the first continuous laser light, wherein the first fluorescent signal indicates to-be-read data, and
      the detector is configured to detect light intensity of the first fluorescent signal thereby obtaining the to-be-read data.

7. The data read/write apparatus according to claim 6, further comprising:
   an isolator, wherein
      the isolator is connected to the laser and the optical fiber coupler by using the optical fibers, and
      the isolator is configured to prevent the first fluorescent signal from being transmitted to the laser.

8. The data read/write apparatus according to claim 6, further comprising:
   a band-pass filter, wherein
      the band-pass filter is connected to the detector and the optical fiber coupler separately, and the band-pass filter is configured to receive the first fluorescent signal and filter the first fluorescent signal, and
      the detector is configured to detect light intensity of the filtered first fluorescent signal thereby obtaining the to-be-read data.

9. The data read/write apparatus according to claim 6, further comprising:
   a piezoelectric actuator, wherein
      the piezoelectric actuator is configured to drive the optical fiber lens to move thereby adjusting a location of the optical fiber lens, and
      the location of the optical fiber lens corresponds to a data recording point on the optical storage medium.

10. The data read/write apparatus according to claim 6, wherein
    the optical fiber lens includes any one of: a gradient refractive index (GRIN) fiber lens, a metamaterial lens, or an optical fiber end ball lens.

11. The data read/write apparatus according to claim 6, wherein
    a wavelength range of the first continuous laser light is 400-500 nanometers.

12. The data read/write apparatus according to claim 6, wherein
    a wavelength of the first fluorescent signal ranges from 600 nanometers to 700 nanometers.

13. A data read/write apparatus, comprising:
    a first laser;
    a dispersion compensator;
    a first optical fiber coupler;
    N optical switches;
    an N-channel photoelectric controller; and
    N optical fiber lenses, wherein
       the first optical fiber coupler is connected to the N optical switches by using optical fibers, the N-channel photoelectric controller is connected to the N optical switches separately, the N optical switches are correspondingly connected to the N optical fiber lenses by using the optical fibers, and N is a positive integer greater than or equal to 2,
       the first laser is configured to output a first optical pulse, the dispersion compensator is configured to perform dispersion compensation on the first optical pulse to output a second optical pulse, the first optical fiber coupler is connected to the dispersion compensator by using an optical fiber, and the first optical fiber coupler is configured to split the second optical pulse into N beams of optical pulses, the N-channel photoelectric controller is configured to control states of the N optical switches based on N control signals thereby adjusting light intensity of the N beams of optical pulses, wherein the N control signals are respectively obtained based on N pieces of to-be-written data, and the N beams of optical pulses indicate the N pieces of to-be-written data, and the N optical fiber lenses are configured to focus the N beams of optical pulses onto an optical storage medium thereby writing the N pieces of to-be-written data to the optical storage medium, wherein the N optical fiber lenses are in one-to-one correspondences with the N beams of optical pulses.

14. The data read/write apparatus according to claim 13, further comprising:
a second laser;
a second optical fiber coupler;
N third optical fiber couplers; and
an N-channel detector, wherein
the N third optical fiber couplers are connected to the second optical fiber coupler, the N optical fiber lenses, and the N-channel detector by using the optical fibers,
the second laser is configured to output first continuous laser light,
the second optical fiber coupler is connected to the second laser by using the optical fiber, and the second optical fiber is configured to split the first continuous laser light into N beams of continuous laser light,
the N optical fiber lenses are further configured to receive the N beams of continuous laser light, focus the N beams of continuous laser light onto the optical storage medium, and receive N fluorescent signals generated by the optical storage medium based on the N beams of continuous laser light, wherein the N optical fiber lenses are in one-to-one correspondences with the N beams of continuous laser light, and the N fluorescent signals respectively indicate N pieces of to-be-read data, and
the N-channel detector is configured to detect light intensity of the N fluorescent signals separately thereby obtaining the N pieces of to-be-read data.

15. A data read/write apparatus, comprising:
a second laser;
a second optical fiber coupler;
N third optical fiber couplers;
N optical fiber lenses; and
an N-channel detector, wherein the N third optical fiber couplers are connected to the second optical fiber coupler, the N optical fiber lenses, and the N-channel detector by using optical fibers,
the second laser is configured to output first continuous laser light,
the second optical fiber coupler is connected to the second laser by using an optical fiber, and the second optical fiber coupler is configured to split the first continuous laser light into N beams of continuous laser light,
the N optical fiber lenses are configured to receive the N beams of continuous laser light, focus the N beams of continuous laser light onto an optical storage medium, and receive N fluorescent signals generated by the optical storage medium based on the N beams of continuous laser light, wherein the N optical fiber lenses are in one-to-one correspondences with the N beams of continuous laser light, and the N fluorescent signals respectively indicate N pieces of to-be-read data, and
the N-channel detector is configured to detect light intensity of the N fluorescent signals separately thereby obtaining the N pieces of to-be-read data.

16. The data read/write apparatus according to claim 15, further comprising:
an isolator, wherein
the isolator is connected to the second laser and the second optical fiber coupler by using the optical fibers, and
the isolator is configured to prevent the N fluorescent signals from being transmitted to the second laser.

17. The data read/write apparatus according to claim 15, further comprising:
N band-pass filters, wherein
the N band-pass filters are connected to the N-channel detector and the N third optical fiber couplers by using optical fibers,
the N band-pass filters are configured to receive the N fluorescent signals and filter the N fluorescent signals, wherein the N band-pass filters are in one-to-one correspondences with the N fluorescent signals, and
the N-channel detector is configured to detect light intensity of the N filtered fluorescent signals separately thereby obtaining the to-be-read data.

18. The data read/write apparatus according to claim 15, further comprising:
a piezoelectric actuator, wherein
the piezoelectric actuator is configured to drive the N optical fiber lenses to move thereby adjusting locations of the N optical fiber lenses, and
the locations of the N optical fiber lenses respectively correspond to different data recording points on the optical storage medium.

* * * * *